United States Patent
Ni et al.

(10) Patent No.: US 7,850,468 B2
(45) Date of Patent: Dec. 14, 2010

(54) LIPSTICK-TYPE USB DEVICE

(75) Inventors: Jim Chin-Nan Ni, San Jose, CA (US);
Abraham C. Ma, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 12/505,327

(22) Filed: Jul. 17, 2009

(65) Prior Publication Data
US 2009/0275224 A1 Nov. 5, 2009

Related U.S. Application Data

(63) Continuation-in-part of application No. 12/361,772, filed on Jan. 29, 2009, and a continuation-in-part of application No. 12/025,706, filed on Feb. 4, 2008, and a continuation-in-part of application No. 11/770,657, filed on Jun. 28, 2007, now Pat. No. 7,708,570, and a continuation-in-part of application No. 11/845,747, filed on Aug. 27, 2007, and a continuation-in-part of application No. 11/950,190, filed on Dec. 4, 2007, and a continuation-in-part of application No. 12/050,748, filed on Mar. 18, 2008, now Pat. No. 7,628,622, and a continuation-in-part of application No. 12/171,194, filed on Jul. 10, 2008, now Pat. No. 7,771,215, and a continuation-in-part of application No. 11/924,540, filed on Oct. 25, 2007.

(51) Int. Cl.
*H01R 13/44* (2006.01)
(52) U.S. Cl. .................................... 439/131
(58) Field of Classification Search ............... 439/131
See application file for complete search history.

(56) References Cited

U.S. PATENT DOCUMENTS

| | | | |
|---|---|---|---|
| 4,582,985 A | 4/1986 | Lofberg | |
| 4,630,201 A | 12/1986 | White | |
| 4,766,293 A | 8/1988 | Boston | |
| 4,833,554 A | 5/1989 | Dalziel et al. | |
| 4,926,480 A | 5/1990 | Chaum | |
| 5,020,105 A | 5/1991 | Rosen et al. | |

(Continued)

FOREIGN PATENT DOCUMENTS

JP 63-163589 A 7/1988

(Continued)

*Primary Examiner*—Phuong K Dinh
(74) *Attorney, Agent, or Firm*—Bever, Hoffman & Harms, LLP; Patrick T. Bever

(57) ABSTRACT

A USB device including a housing and a rear cap that is rotatably connected to the housing to facilitate deploying and retracting a plug connector through a front opening of the housing. The plug connector is fixedly connected onto the front end of a sliding rack assembly that is disposed in housing such that the sliding rack assembly is slidable along a longitudinal axis. The sliding rack assembly includes a carrier including a carrier tray for supporting electronic devices and an elongated positioning rod extending from a rear portion of the carrier tray. The positioning rod is operably engaged with an actuator portion such that manual rotation of the rear cap relative to the housing around the longitudinal axis causes the sliding rack assembly to slide inside the housing between retracted and deployed positions.

17 Claims, 16 Drawing Sheets

U.S. PATENT DOCUMENTS

| | | | |
|---|---|---|---|
| 5,180,901 A | 1/1993 | Hiramatsu | |
| 5,280,527 A | 1/1994 | Gullman et al. | |
| 5,404,485 A | 4/1995 | Ban | |
| 5,430,859 A | 7/1995 | Norman et al. | |
| 5,479,638 A | 12/1995 | Assar et al. | |
| 5,623,552 A | 4/1997 | Lane | |
| 5,797,771 A | 8/1998 | Garside | |
| 5,835,760 A | 11/1998 | Harmer | |
| 5,899,773 A | 5/1999 | Cheng | |
| 5,907,856 A | 5/1999 | Estakhri et al. | |
| 5,936,884 A | 8/1999 | Hasbun et al. | |
| 5,959,541 A | 9/1999 | DiMaria et al. | |
| 5,984,731 A | 11/1999 | Laity | |
| 6,000,006 A | 12/1999 | Bruce et al. | |
| 6,012,636 A | 1/2000 | Smith | |
| 6,044,428 A | 3/2000 | Rayabhari | |
| 6,069,920 A | 5/2000 | Schulz et al. | |
| 6,069,970 A | 5/2000 | Salatino et al. | |
| 6,081,858 A | 6/2000 | Abudayyeh et al. | |
| 6,125,192 A | 9/2000 | Bjorn et al. | |
| 6,132,243 A | 10/2000 | Hirata et al. | |
| 6,145,069 A | 11/2000 | Dye | |
| 6,148,354 A | 11/2000 | Ban et al. | |
| 6,159,039 A | 12/2000 | Wu | |
| 6,193,152 B1 | 2/2001 | Fernando et al. | |
| 6,202,138 B1 | 3/2001 | Estakhri et al. | |
| 6,230,233 B1 | 5/2001 | Lofgren et al. | |
| 6,275,894 B1 | 8/2001 | Kuo et al. | |
| 6,279,955 B1 | 8/2001 | Fisher | |
| 6,292,863 B1 | 9/2001 | Terasaki et al. | |
| 6,321,478 B1 | 11/2001 | Klebes | |
| 6,334,793 B1 | 1/2002 | Amoni et al. | |
| 6,438,638 B1 | 8/2002 | Jones et al. | |
| 6,456,500 B1 | 9/2002 | Chen | |
| 6,480,390 B2 | 11/2002 | Matsumiya et al. | |
| 6,547,130 B1 | 4/2003 | Shen | |
| 6,554,648 B2 | 4/2003 | Shi et al. | |
| 6,567,273 B1 | 5/2003 | Liu et al. | |
| 6,615,404 B1 | 9/2003 | Garfunkel et al. | |
| 6,618,243 B1 | 9/2003 | Tirosh | |
| 6,636,929 B1 | 10/2003 | Frantz et al. | |
| 6,718,407 B2 | 4/2004 | Martwick | |
| 6,737,591 B1 | 5/2004 | Lapstun et al. | |
| 6,743,030 B2 | 6/2004 | Lin et al. | |
| 6,763,410 B2 | 7/2004 | Yu | |
| D494,969 S | 8/2004 | Lin | |
| 6,778,401 B1 | 8/2004 | Yu et al. | |
| 6,792,487 B2 | 9/2004 | Kao | |
| 6,808,400 B2 | 10/2004 | Tu | |
| 6,854,984 B1 | 2/2005 | Lee et al. | |
| 6,880,024 B2 | 4/2005 | Chen et al. | |
| 7,004,780 B1 | 2/2006 | Wang | |
| 7,021,971 B2 | 4/2006 | Chou et al. | |
| 7,044,802 B2 | 5/2006 | Chiou et al. | |
| 7,069,370 B2 | 6/2006 | Sukegawa et al. | |
| 7,074,052 B1 | 7/2006 | Ni et al. | |
| 7,090,541 B1 | 8/2006 | Ho | |
| 7,097,472 B2 | 8/2006 | Parker | |
| 7,103,684 B2 | 9/2006 | Chen et al. | |
| 7,103,765 B2 | 9/2006 | Chen | |
| 7,104,848 B1 | 9/2006 | Chou et al. | |
| 7,125,287 B1 | 10/2006 | Chou et al. | |
| 7,155,545 B1 | 12/2006 | Wang | |
| 7,172,460 B2 * | 2/2007 | Zhao et al. | 439/607.56 |
| 7,182,646 B1 | 2/2007 | Chou et al. | |
| 7,214,075 B2 | 5/2007 | He et al. | |
| 7,249,978 B1 | 7/2007 | Ni | |
| 7,257,714 B1 | 8/2007 | Shen | |
| 7,259,967 B2 | 8/2007 | Ni | |
| 7,264,992 B2 | 9/2007 | Hsueh et al. | |
| 7,303,411 B1 | 12/2007 | Morganstern et al. | |
| 7,359,208 B2 | 4/2008 | Ni | |
| 7,361,059 B2 | 4/2008 | Harkabi et al. | |
| 7,407,393 B2 | 8/2008 | Ni et al. | |
| 7,420,803 B2 | 9/2008 | Hsueh et al. | |
| 7,524,198 B2 | 4/2009 | Nguyen et al. | |
| 2001/0043174 A1 | 11/2001 | Jacobsen et al. | |
| 2002/0036922 A1 | 3/2002 | Roohparvar | |
| 2002/0166023 A1 | 11/2002 | Nolan et al. | |
| 2003/0046510 A1 | 3/2003 | North | |
| 2003/0100203 A1 | 5/2003 | Yen | |
| 2003/0163656 A1 | 8/2003 | Ganton | |
| 2003/0177300 A1 | 9/2003 | Lee et al. | |
| 2003/0182528 A1 | 9/2003 | Ajiro | |
| 2004/0034765 A1 | 2/2004 | O'Connell | |
| 2004/0148482 A1 | 7/2004 | Grundy et al. | |
| 2004/0153595 A1 | 8/2004 | Sukegawa et al. | |
| 2004/0255054 A1 | 12/2004 | Pua et al. | |
| 2005/0009388 A1 | 1/2005 | Chao | |
| 2005/0085133 A1 | 4/2005 | Wang et al. | |
| 2005/0102444 A1 | 5/2005 | Cruz | |
| 2005/0114587 A1 | 5/2005 | Chou et al. | |
| 2005/0120146 A1 | 6/2005 | Chen et al. | |
| 2005/0160213 A1 | 7/2005 | Chen | |
| 2005/0182858 A1 | 8/2005 | Lo et al. | |
| 2005/0193161 A1 | 9/2005 | Lee et al. | |
| 2005/0193162 A1 | 9/2005 | Chou et al. | |
| 2005/0216624 A1 | 9/2005 | Deng et al. | |
| 2005/0246243 A1 | 11/2005 | Adams et al. | |
| 2005/0268082 A1 | 12/2005 | Poisner | |
| 2005/0271458 A1 | 12/2005 | Kui | |
| 2006/0065743 A1 | 3/2006 | Fruhauf | |
| 2006/0075174 A1 | 4/2006 | Vuong | |
| 2006/0106962 A1 | 5/2006 | Woodbridge et al. | |
| 2006/0161725 A1 | 7/2006 | Lee et al. | |
| 2006/0184709 A1 | 8/2006 | Sukegawa et al. | |
| 2006/0206702 A1 | 9/2006 | Fausak | |
| 2006/0234533 A1 | 10/2006 | Lei et al. | |
| 2006/0242395 A1 | 10/2006 | Fausak | |
| 2007/0079043 A1 | 4/2007 | Yu et al. | |
| 2007/0094489 A1 | 4/2007 | Ota et al. | |
| 2007/0113267 A1 | 5/2007 | Iwanski et al. | |
| 2007/0130436 A1 | 6/2007 | Shen | |
| 2007/0171620 A1 | 7/2007 | Lee | |
| 2008/0160832 A1 | 7/2008 | Morganstern et al. | |
| 2008/0232060 A1 | 9/2008 | Yu et al. | |
| 2008/0261450 A1 | 10/2008 | Nguyen et al. | |
| 2009/0124104 A1 * | 5/2009 | Zhu et al. | 439/131 |
| 2010/0124831 A1 * | 5/2010 | Chou et al. | 439/131 |

FOREIGN PATENT DOCUMENTS

| | | |
|---|---|---|
| JP | 02-118790 A | 5/1990 |
| JP | 11-039483 | 2/1999 |

* cited by examiner

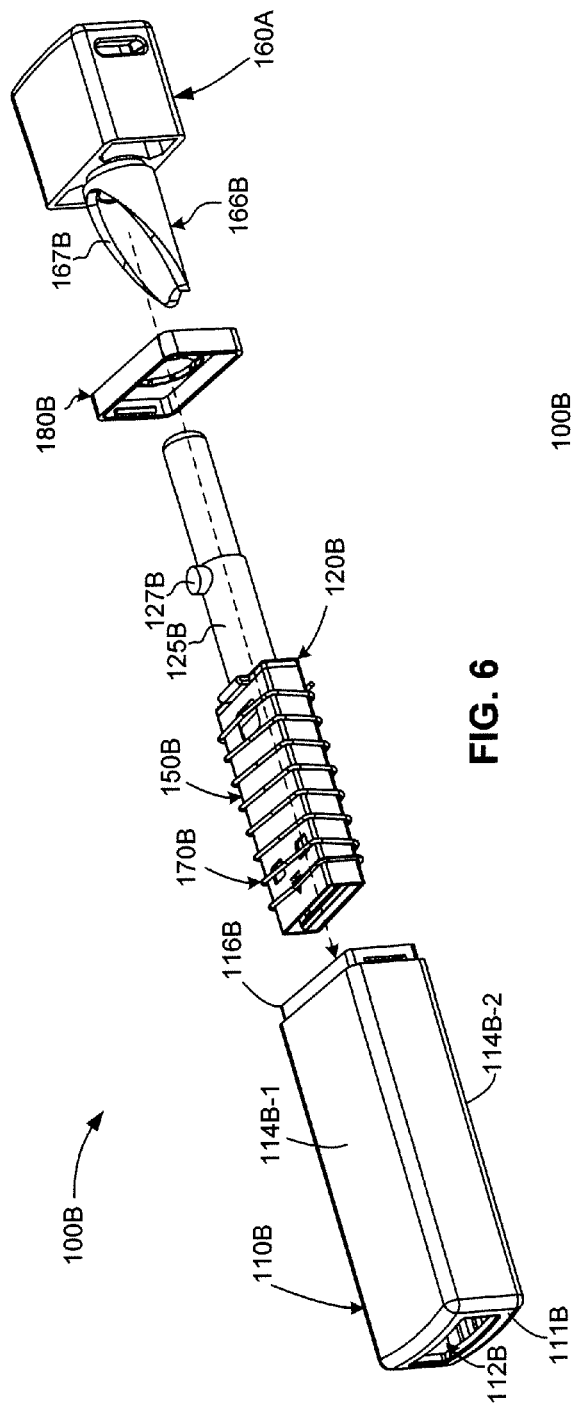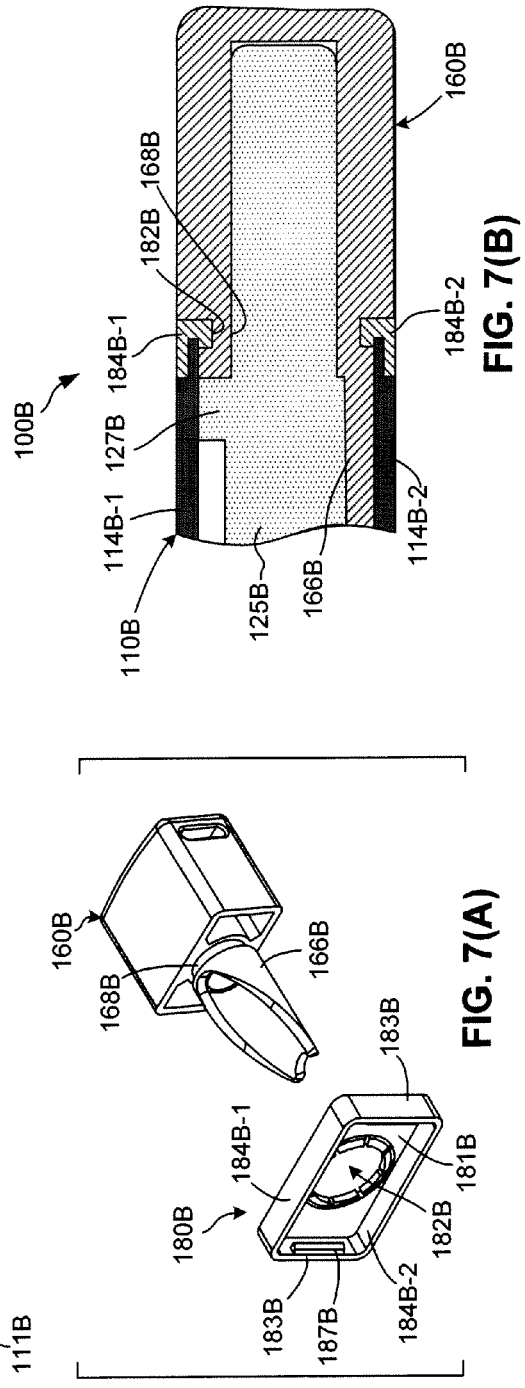
FIG. 6
FIG. 7(A)
FIG. 7(B)

LIPSTICK-TYPE USB DEVICE

RELATED APPLICATIONS

This application is continuation-in-part of U.S. patent application for "FLASH DRIVE WITH SPRING-LOADED RETRACTABLE CONNECTOR", U.S. application Ser. No. 12/361,772, filed on Jan. 29, 2009.

This application is also a CIP of U.S. patent application for "Methods and Systems of Managing Memory Addresses in a Large Capacity Multi-Level Cell (MLC) based flash memory device", U.S. application Ser. No. 12/025,706, filed Feb. 4, 2008.

This application is also a CIP of U.S. patent application for "LIP STICK UNIVERSAL SERIAL BUS FLASH DRIVE WITH DEPLOYING AND RETRACTING FUNCTIONALITIES", U.S. application Ser. No. 11/770,657, filed Jun. 28, 2007.

This application is also a CIP of U.S. patent application for "Press/Push USB Flash Drive with Deploying and Retracting Functionalities with Elasticity Material and Fingerprint Verification Capability", U.S. application Ser. No. 11/845,747, filed Aug. 27, 2007.

This application is also a CIP of U.S. patent application for "Pen-Like Universal Serial Bus (USB) Flash Drive with Deploying and Retracting Functionalities", U.S. application Ser. No. 11/950,190, filed Dec. 4, 2007.

This application is also a CIP of U.S. patent application for "Multi-Level Cell (MLC) Slide Flash Memory Device", U.S. application Ser. No. 12/050,748, filed Mar. 18, 2008.

This application is also a CIP of U.S. patent application for "MLC COB USB Flash Memory Device with Sliding Plug Connector", U.S. application Ser. No. 12/171,194, filed Jul. 10, 2008.

This application is also a CIP of U.S. patent application for "PORTABLE AND RETRACTABLE FLASH DRIVE WITH OPTIONAL ROTARY DEPLOYING AND RETRACTING AND FINGERPRINT VERIFICATION CAPABILITY", U.S. application Ser. No. 11/924,540, filed Oct. 25, 2007.

FIELD OF THE INVENTION

This invention relates to portable electronic devices, and more particularly to portable electronic devices such as those that utilize the Universal-Serial-Bus (USB) specification.

BACKGROUND OF THE INVENTION

In the past, confidential data files were stored in floppy disks or were delivered via networks that require passwords or that use encryption coding for security. Confidential documents can be sent by adding safety seals and impressions during delivering. However, the aforesaid are exposed to the risks of breaking of the passwords, encryption codes, safety seals and impressions, thereby resulting in unsecure transfer of information.

More recently, there is an ongoing trend towards the use of miniaturized, portable computer peripheral devices to store confidential data. In certain cases, such peripheral devices have been reduced to "pocket size", meaning that they can literally be carried in a user's pocket in the same manner as a wallet or set of keys. One example of particular interest, in which context the present invention will be described herein, is a "flash disk", "Universal Serial Bus (USB) flash drive", or simply "USB device".

USB flash drives are available in various shapes and forms. The USB flash drive uses a USB (male) plug connector to be coupled to a USB (female) plug socket (port) provided on a host device such as a PC. A problem associated with USB flash drives is that the USB (male) plug connector must be kept covered when not in use in order to prevent contamination of the contact pads, which would prevent the USB device from operating properly when plugged into a (female) plug socket connected to a host system. The USB flash drive generally includes a metal or plastic casing and a cap which is screwed or otherwise attached to the casing over the USB plug connector during transport (non-operation) periods. When operation of the USB flash drive is desired, the USB plug connector is accessed by removing the cap from the casing, thus exposing the plug connector for insertion into the host system port. When the desired operation is completed, the USB flash drive is pulled to extract the plug connector from the port, and then the cap is reattached onto the casing over the plug connector.

A problem with conventional removable-cap-type USB flash drives is that, once the cap is removed, it may be lost or forgotten, thereby exposing the plug connector to contamination or damage during subsequent transport periods, thereby risking failure of the USB flash drive and the loss of valuable information.

A conventional solution for the problem of keeping the plug connector clean during transport without using a detachable cap is to provide a USB device with a retractable plug connector in which an actuator is used to retract the plug connector into the device housing during transport, and to deploy (extend) the plug connector from an opening in the front of the housing for plugging into a host system during operation. Conventional USB devices that utilize retracting actuators are referred to as "pen-type" USB devices, and utilize a press-push (thumb-button) actuator accessible by way of a slot defined in a side or edge wall of the housing.

A problem with conventional pen-type USB devices is that the press-push actuator can become fouled or otherwise jam after repeated use, which can cause the actuator to become painful to operate, and may fail entirely, thereby causing the loss of valuable information.

What is needed is a retractable portable computer peripheral device that overcomes the problems associated with conventional retractable structures. What is particularly needed is a high quality retractable USB device that has a very low production cost, and provides a reliable deploying mechanism that allows a user to comfortably apply a significant actuating force.

SUMMARY OF THE INVENTION

The present invention is directed to a lipstick-type USB device (or other portable computer peripheral apparatus utilizing a lipstick-type actuator) including a rear cap that is rotatably connected to a housing, and includes an actuator portion that is operably engaged with an elongated positioning rod extending from the rear of a sliding rack assembly that is movably disposed in the housing such that, when the rear cap is manually rotated by a user around a longitudinal axis, the sliding rack assembly is caused to move along the longitudinal axis inside the housing, thereby causing a plug connector disposed on a front end of the sliding rack assembly to move between a retraced position inside the housing and a deployed position in which the plug connector is exposed outside a front opening of the housing for operable coupling to a host system. The rear cap and housing remain rotatably connected together at all times (i.e., such that the rear cap remains secured to the housing (a) in a deployed position when the plug connector is extended through the front opening of the housing to facilitate connection of the plug connector to a host system during operating periods, (b) in a retracted position when the plug connector is positioned inside the housing when the USB device is not in use, and (c) during movement of the plug connector between the deployed and retracted positions), thereby preventing loss of the rear cap during operation. In one embodiment, one or more positioning knobs are disposed on the positioning rod, the actuator portion of the rear cap includes one of an oval cam surface and a spiral groove, and the positioning knob is operably engaged with the cam surface/spiral groove such that the positioning knob remains coupled to the actuator portion while the sliding rack assembly is slid between the retracted position and the deployed position. By providing such a lipstick-type actuating mechanism in which the plug connector is deployed and retracted by rotating a rear cap relative to the housing, the present invention provides a convenient, reliable and easy to use retractable USB device that avoids fouling or jamming after repeated use by avoiding slots or other openings into the housing, and thereby avoiding the loss of valuable information by preventing failure of the USB device to deploy. In addition, by utilizing a positioning rod that extends from the rear end of a sliding rack assembly and operably engages an actuating portion of the rear cap, the present invention provides a high quality retractable USB device that has a very low production cost, and provides a reliable deploying mechanism that allows a user to comfortably apply a significant actuating force.

According to an aspect of the invention, the rear cap includes opposing upper, lower and side walls that have the same spacing as upper, lower and side walls of the housing, and the actuating mechanism is disposed such that the upper and lower walls of the rear cap are substantially co-planar with the opposing upper and lower walls of the housing when the plug connector is in both the fully deployed and fully retracted positions, thereby providing an aesthetically pleasing package that can be comfortably carried in a user's pocket.

According to an embodiment of the present invention, a lipstick-type USB device includes a deploy/retract actuator constructed such that the rotatable cap is freely rotatable around the longitudinal axis relative to the housing an unlimited number of full rotations in both the clockwise and counterclockwise directions. In particular, the deploy/retract actuator is constructed such that, when the rotatable cap is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of the rotating cap when the sliding rack assembly reaches the fully deployed or fully retracted positions inside the housing.

According to a specific embodiment of the present invention, a lipstick-type USB device includes a box-like housing having a front opening and a rear edge, a sliding rack assembly that is movably disposed inside the housing, a rear cap disposed over the rear edge and rotatably connected to the housing. The rear cap includes an actuator portion that includes a substantially oval cam surface, and the rack assembly carrier includes one or more positioning knobs that are disposed on the positioning rod and operably engaged with the substantially oval cam surface. A plug connector disposed at a front end of the sliding rack assembly and aligned with the front opening of the housing. A spring (or other resilient member) is disposed inside the housing, and serves to bias the sliding rack assembly toward the rear cap, thereby maintaining the positioning knob in contact with the cam surface. In response to rotation of the rear cap, the substantially oval cam surface applies a force against the positioning knob that is transferred to the sliding rack assembly by the positioning rod. When rotation of the rear cap causes the positioning knob to slide on a forward slanting portion of the cam surface, the sliding rack assembly is pushed forward against the spring bias, and the plug connector is moved through the front opening into the deployed position in which the plug connector is exposed for operable coupling to a host system. When rotation of the rear cap causes the positioning knob to slide on a backward slanting portion of the cam surface, the spring bias pushes the sliding rack assembly toward the back of the housing, thereby moving the plug connector into a retracted position in which said plug connector is fully retracted inside the housing. This arrangement allows the cap to freely rotate around the longitudinal axis relative to the housing an unlimited number of full rotations in both the clockwise and counterclockwise directions without worrying about applying a damaging torque to the actuating mechanism.

According to alternative embodiments of the invention, the substantially oval cam surface is either disposed on a structure extending into the housing, or formed on a hollow region disposed inside the rear cap. In one specific embodiment, the rear cap includes a hollow cylindrical wedge-shaped structure extending from the rear cap into the housing, where the hollow cylindrical wedge-shaped structure has a peripheral edge defining the substantially oval cam surface. In another specific embodiment, a hollow cylindrical structure is disposed inside of the rear cap, and said substantially oval cam surface is disposed on an inside surface of said hollow cylindrical structure. In both specific embodiments, the positioning knob disposed on the positioning rod extending from the rear end of the sliding rack assembly is pressed against the substantially oval cam surface by a spring, thereby facilitating reliable positioning of the plug connector.

According to an aspect of the invention, locking grooves are provided on the substantially oval cam surface to conveniently hold the sliding rack mechanism in the fully deployed and fully retracted positions. In particular, the positioning knobs slide along the cam surface between a forward (first) locking groove that holds the USB device in the fully deployed position, and a rear (second) locking groove that holds the USB device in the fully retracted position. The locking grooves are formed such that a user must apply a relatively large force to the rear cap in order to displace the positioning knob out of the locking grooves, thereby preventing undesirable deploying or retraction of the plug connector.

Various housing arrangements are utilizing to facilitate low cost assembly and production of the USB device. In one embodiment, the rear cap includes a locking slot, and the housing includes upper and lower housing portions that are snap coupled to each other, wherein both the upper and lower housing portions have rear wall sections that are shaped to slidably engage the locking slot when assembled, thereby minimizing assembly costs. In another embodiment, the housing includes an integral (single molded piece) structure, and a coupler is snap-coupled to the rear edge of the housing that defines a center opening for engaging a locking slot of the rear cap such that the rear cap is rotatably connected to the housing by way of the coupler.

According to another embodiment, a restricted rotation lipstick-type USB device is characterized in that rotation of the rear cap is restricted to a limited number of rotations in either the clockwise or counterclockwise direction. In this embodiment, to prevent damage to the actuating mechanism due to the restricted rotation, the USB device includes stop structures that prevent over-rotation of the rear cap, thereby preventing damage to the actuating mechanism.

According to various alternative embodiments, the specific USB device packages described herein may be modified to house a conventional PCBA structure, a PCBA constructed using a chip-on-board (COB) process, or a PCBA constructed using a surface-mount technology (SMT) slim type PCBA process. The various structures may also be utilized to produce other types of portable computer peripheral apparatus.

BRIEF DESCRIPTION OF THE DRAWINGS

These and other features, aspects and advantages of the present invention will become better understood with regard to the following description, appended claims, and accompanying drawings, where:

FIG. 6 is an exploded perspective view showing an exemplary USB device according to another specific embodiment of the present invention;

FIGS. 7(A) and 7(B) are perspective and simplified cross-sectional side views showing a portion of the USB device of FIG. 6;

DETAILED DESCRIPTION OF THE DRAWINGS

The present invention relates to an improvement in low-profile USB connectors. The following description is presented to enable one of ordinary skill in the art to make and use the invention as provided in the context of a particular application and its requirements. As used herein, directional terms such as "front", "back" "upper", "upwards", "lower", "side", "upward" and "downward" are intended to provide relative positions for purposes of description, and are not intended to designate an absolute frame of reference. In addition, the term "integrally molded" is intended to mean that the subject items are formed together in a single molding process, as opposed to being formed separately and then connected, e.g., by adhesive. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
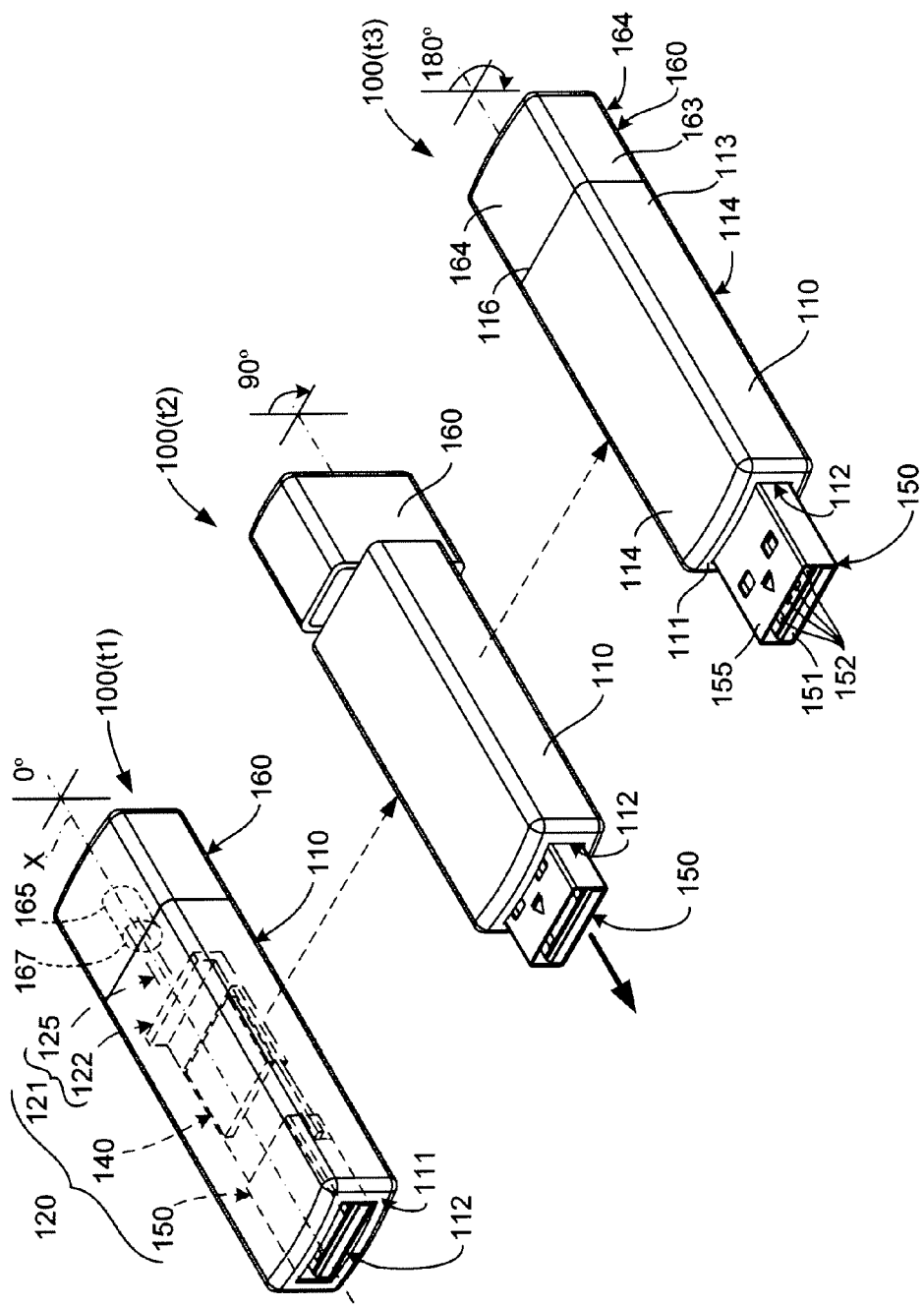
FIG. 1 includes sequential perspective views showing an exemplary USB device according to a generalized embodiment of the present invention during operation.

FIG. 1 includes sequential perspective views showing an exemplary lipstick-type USB device (portable computer peripheral apparatus) 100 according to a generalized embodiment of the present invention. Referring to the left side of FIG. 1, lipstick-type USB device 100 generally includes a housing 110, a sliding rack assembly 120 movably disposed in the housing, and a rear cap 160 that is rotatably connected to rear end of the housing. Referring to the lower right portion of FIG. 1, housing 110 is a molded plastic or metal box-like structure having a front end portion 111 defining a front opening 112, opposing side walls 113 and opposing upper and lower walls 114 extending from the front end portion and defining an elongated central cavity, and a rear edge 116 disposed at a back portion of the central cavity. Sliding rack assembly 120 is disposed in housing 110 such that sliding rack assembly 120 is slidable along a longitudinal axis X extending through the elongated central cavity defined by housing 110. Sliding rack assembly 120 generally includes a carrier 121 including a plastic carrier tray 122 and an elongated positioning rod 125 that extends from a rear portion of carrier tray 122 and is fixedly connected or integrally molded to a rear section of carrier tray 122. At least one electronic device 140 is fixedly connected to the carrier (e.g., mounted on carrier tray 122), and a standard USB plug connector 150 is fixedly connected to a front end of carrier tray 122. Referring to the bottom right portion of FIG. 1, plug connector 150 includes a substrate 151 having four of metal contacts 152 formed thereon, and a metal plug shell 155 that extends over substrate 151. Metal contacts 152 are shaped and arranged in a pattern established by the USB specification, and are electronically coupled to electronic device 140 according to known techniques. Rear cap 160 is rotatably connected over rear edge 116 of housing 110, and includes a box-like structure formed by side walls 163 and upper and lower walls 164, and includes an actuator portion 165 disposed either between walls 163/164 or extending into housing 110.

According to an aspect of the present invention, actuator portion 165 is operably engaged with positioning rod 125 such that manual rotation of rear cap 160 relative to housing 110 around longitudinal axis X causes sliding rack assembly 120 to slide inside housing 110 between a retracted position in which plug connector 150 is disposed inside of housing 110, and a deployed position in which plug connector 150 protrudes through and is exposed outside front opening 112 for operable coupling to a host system (not shown). According to various embodiments described below, one or more positioning knobs are disposed on positioning rod 125 that operably engage a cam surface or a spiral groove disposed on the actuator portion 165 of rear cap 160, whereby rotation of rear cap 160 causes the cam surface/spiral groove to apply force on the positioning knob, thereby pushing/pulling positioning rod 122 such that sliding rack assembly 120 is causes to slide within housing 110. FIG. 1 shows various the operating positions achieved by such an actuating mechanism. For example, USB device 100 is shown at the top left portion of FIG. 1 at a first time t1 (indicated by reference designation "100(t1)") in a fully retracted position (i.e., rear cap 160 is subject to 0° of rotation around longitudinal axis X). Subsequent rotation of rear cap 160 around longitudinal axis X by a predetermined amount (e.g., 90°, as indicated in the middle of FIG. 1) while housing 110 maintained in a stationary position causes actuator portion 165 to push positioning rod 125 (shown in the upper left portion of FIG. 1) toward front wall 111, thereby causing plug connector 150 to partially protrude through front opening 112. Further rotation of rear cap 160 around longitudinal axis X (e.g., 180°, as indicated in the lower right portion of FIG. 1) while housing 110 maintained in a stationary position causes actuator portion 165 to further push positioning rod 125 toward front wall 111, thereby causing plug connector 150 to fully deploy through front opening 112. As described below, subsequent rotation of rear cap 160 relative to housing 110 is performed to retract plug connector 150 back into housing 110. By providing such a lipstick-type actuating mechanism in which plug connector 150 is deployed and retracted by rotating rear cap 160 relative to housing 110, the present invention provides a convenient, reliable and easy to use retractable USB device that avoids fouling or jamming after repeated use by avoiding slots or other openings into the housing that are present in conventional pen-type retractable devices, and thereby avoiding the loss of valuable information by preventing failure of the USB device to deploy. In addition, by utilizing positioning rod 122, which extends from the rear end of sliding rack assembly 120 and is operably engaged to actuating portion 165 of rear cap 160, the present invention provides a high quality retractable USB device that has a very low production cost, and provides a reliable deploying mechanism that allows a user to comfortably apply a greater actuating force than is possible using a conventional pen-type actuating mechanism.

According to another aspect of the present invention, rear cap 160 and housing 110 remain rotatably connected together at all times (i.e., such that rear cap 160 remains secured to housing 110 (a) at time t1 when plug connector 150 is in the retracted position shown at the upper left of FIG. 1, (b) in the deployed position when plug connector 150 extends through front opening 112 as shown in the lower right portion of FIG. 1, and (c) during movement of plug connector 150 between the deployed and retracted positions), thereby preventing loss of rear cap 160 during operation.

According to another aspect of the invention, the actuating mechanism is arranged such that rear cap 160 and housing 110 form a single continuous rectangular casing when plug connector 150 is in the fully deployed and fully retracted positions. That is, actuating portion 165 and positioning rod 125 interact such that side walls 163 and opposing upper and lower walls 164 of rear cap 160 are aligned with side walls 113 and upper/lower walls 114 of housing 110 when plug connector 150 is fully retracted (as shown in the upper left portion of FIG. 1) or fully deployed (as shown in the lower right portion of FIG. 1). This arrangement provides USB device 100 with an aesthetically pleasing appearance and facilitates comfortable storage in a user's pocket.

Various specific embodiments of the present invention will now be described with reference to FIGS. 2-17, where FIGS. 2-13 depict freely rotating embodiments of the present invention, and FIGS. 14-17 describe a restricted rotation embodiment of the present invention. In the freely rotating embodiments, the actuator portion of the rear cap is engaged with positioning rod such that the rear cap is freely rotatable around the longitudinal axis relative to the housing, whereby the rear cap can be turned an unlimited number of full rotations in both the clockwise and counterclockwise directions relative to the housing. In particular, the deploy/retract actuator is constructed such that, when the rotatable cap is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of the rotating cap when the sliding rack assembly reaches the fully deployed or fully retracted positions inside the housing. In contrast, in the restricted rotation embodiment of the present invention, rotation of the rear cap is restricted to a limited number of rotations in either the clockwise or counterclockwise direction.

Figure 2:
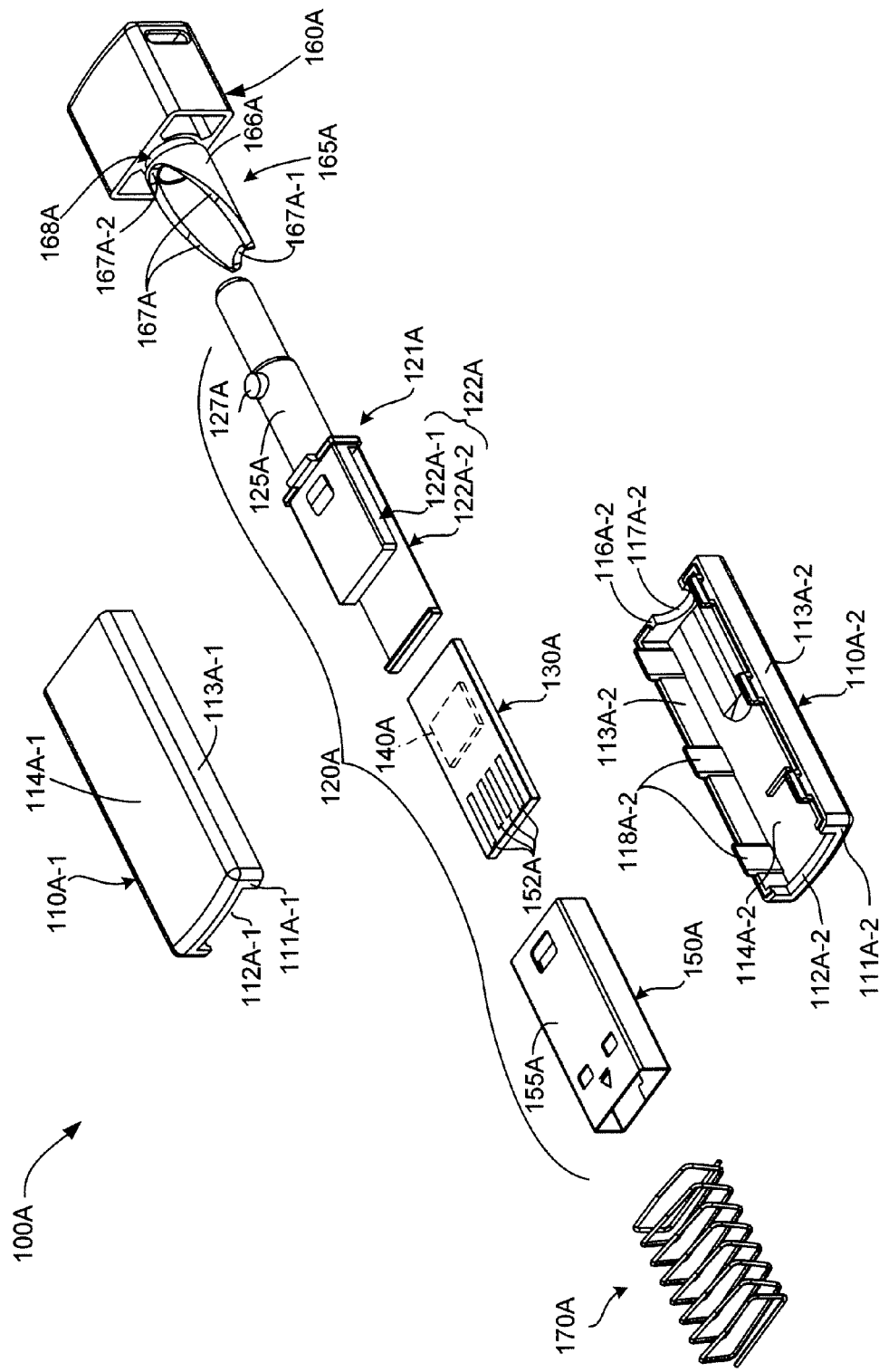
FIG. 2 is an exploded perspective view showing a USB device according to a first specific embodiment of the present invention.

FIG. 2 is an exploded perspective view showing a freely rotating lipstick-type USB device 100A according to a first specific embodiment of the present invention. USB device 100A generally includes a two-part housing including an upper housing portion 100A-1 and a lower housing portion 100A-2, a sliding rack assembly 120A, a rear cap 160A, and a spring 170A.

Housing portions 110A-1 and 110A-2 are molded plastic structures having front end portions 111A-1 and 111A-2, respectively, that defining front opening portions 112A-1 and 112A-2, respectively. Lower housing portion 110A-2 includes opposing side wall portions 113A-2 and a lower wall 114A-2 extending from front end portion 111A-2 and defining an elongated central cavity portion 115A-2, and a rear wall portion 116A-2. Upper housing portion 110A-1 is similarly constructed to include side wall portions 113A-1, an upper wall 114A-1, and a rear wall portion (not shown). According to an aspect of the present embodiment, lower housing portion 110A-2 includes male snap-coupling structures 118A-2 that extend upward from side walls 113A-2 and cooperate with corresponding female structures (not shown) disposed on upper housing portion 110A-1 to facilitate snap-coupling of lower housing portion 110A-2 to upper housing portion 110A-1.

Referring to the center of FIG. 2, sliding rack assembly 120A generally includes a carrier 121A, a molded, single piece chip-on-board (COB) type PCBA 130A, and an elongated metal connector plug shell 150A. Carrier 121A includes a plastic carrier tray 122A and an elongated positioning rod 125A that extends from a rear portion of carrier tray 122A and is fixedly connected or integrally molded to a rear section of carrier tray 122A. As described below, a positioning knob 127A is provided on positioning rod 125A to serve as part of an actuating mechanism. Carrier tray 122A includes an upper tray portion 122A-1 and a lower tray portion 122A-2 that form a clip-like structure for receiving and securing PCBA 130A. PCBA 130A includes standard USB metal contacts 152A formed on a first (e.g., upper) surface of a PCB, and IC components (e.g., flash memory chip 140A) mounted on the opposite (e.g., lower) surface of the PCB. A molded casing is then mounted or otherwise formed over the IC components (i.e., over the lower surface of the PCBA). The casing has a planar surface that is parallel to the PCB and extends along the entire length of the PCBA (e.g., from a front edge of the plug structure to a rear edge of the PCB). Accordingly, PCBA 130A is a flat, low-profile (thin) structure that can be easily incorporated into USB device 100A, e.g., using carrier 121A, by mounting PCBA 130A between upper tray portion 122A-1 and lower tray portion 122A-2 of carrier tray 122A. Plug connector 150A is fixedly connected to a front end of carrier tray 122 over PCBA 130A such that metal contacts 152A are exposed in a gap according to USB standards.

Referring to the right side of FIG. 2, rear cap 160A includes a box-like handle structure similar that described above, and an actuator portion 165A that includes a hollow cylindrical wedge-shaped structure 166A extending from the handle structure. As described below, wedge-shaped structure 166A includes a substantially oval cam surface 167A that cooperates with positioning knob 127A to serve as an actuating mechanism for deploying/retracting plug connector 150A. Cam surface 167A includes a front (first) locking groove 167A-1 and a rear (second) locking groove 167A-2 that serve to hold USB device 100A in the fully deployed and fully retraced positions, respectively, in the manner descried below. Finally, a neck-like locking slot 168A is defined between hollow cylindrical wedge-shaped structure 166A and the handle portion of rear cap 160A, which serves to rotatably secure rear cap 160A to the housing in the manner described below.

FIGS. 3(A) to 3(D) illustrate a simplified process for assembling USB device 101A according to an embodiment of the present invention.

Figure 3A:
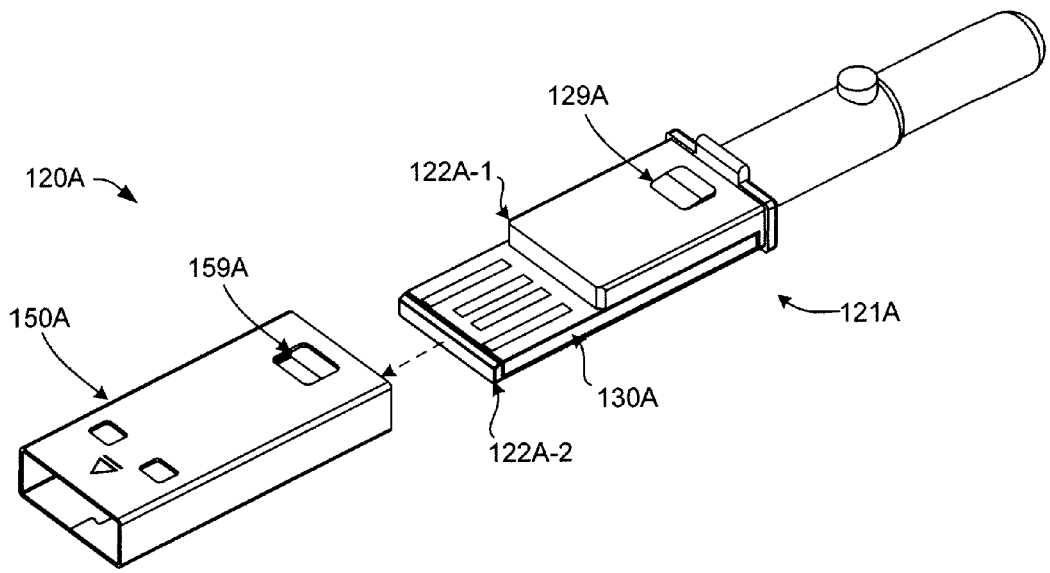
FIGS. 3(A), 3(B), 3(C) and 3(D) are exploded perspective views showing the USB device of FIG. 2 during assembly.

Referring to FIG. 3(A), sliding rack assembly 120A is assembled by mounting COB PCBA 130A between upper tray portion 122A-1 and lower tray portion 122A-2 of carrier 121A, and then this sub-assembly is inserted rough a rear opening defined in plug connector 150A until a coupling structure 129A disposed on upper tray portion 122A-1 is received in a lock opening 159A defined in plug connector 150A.

Figure 3B:
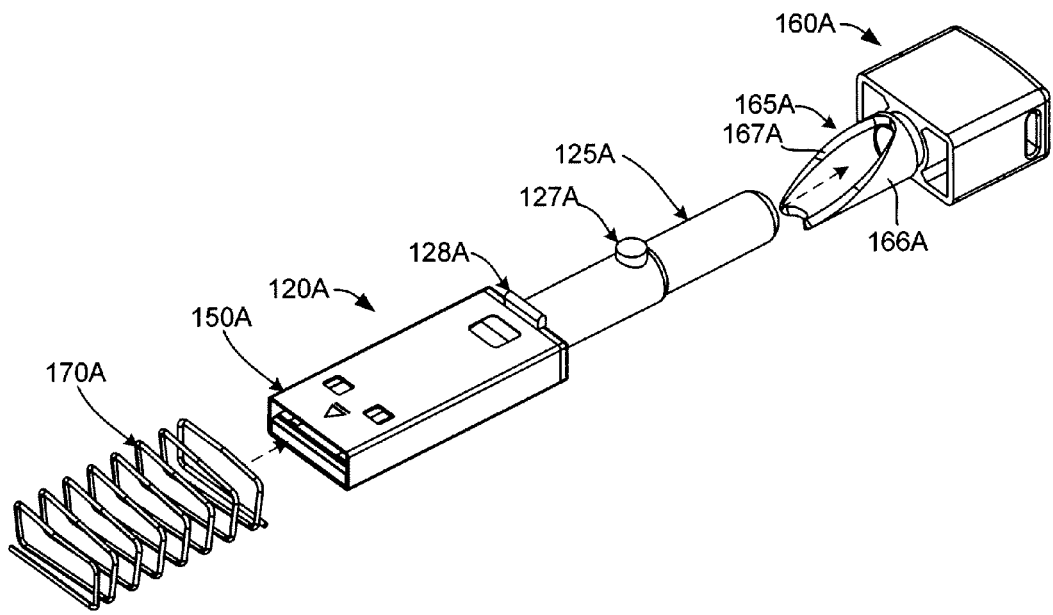

Referring to FIG. 3(B), spring 170A is then mounted over plug connector 150A of sliding rack assembly 120A, and positioning rod 125A is inserted into hollow cylindrical wedge-shaped structure 166A of rear cap 160A. Note that spring 170A is too large to fit through the front opening of the housing, and is prevented from sliding over positioning rod 125A by a wall structure 128A. Note also that positioning knob 127A contacts substantially oval cam surface 167A when positioning rod 125A is inserted into hollow cylindrical wedge-shaped structure 166A.

Figure 3C:
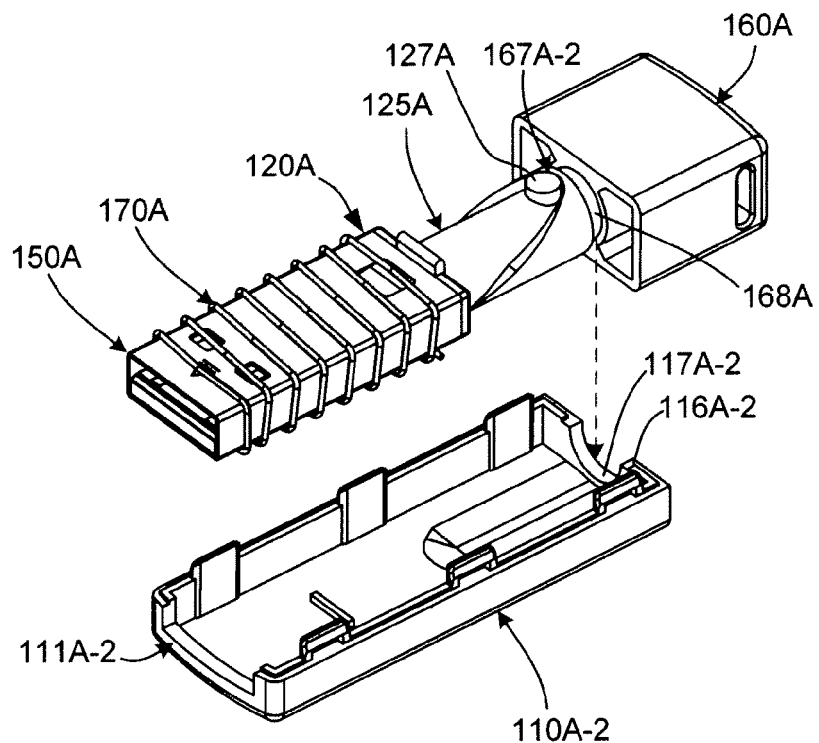
Figure 3D:
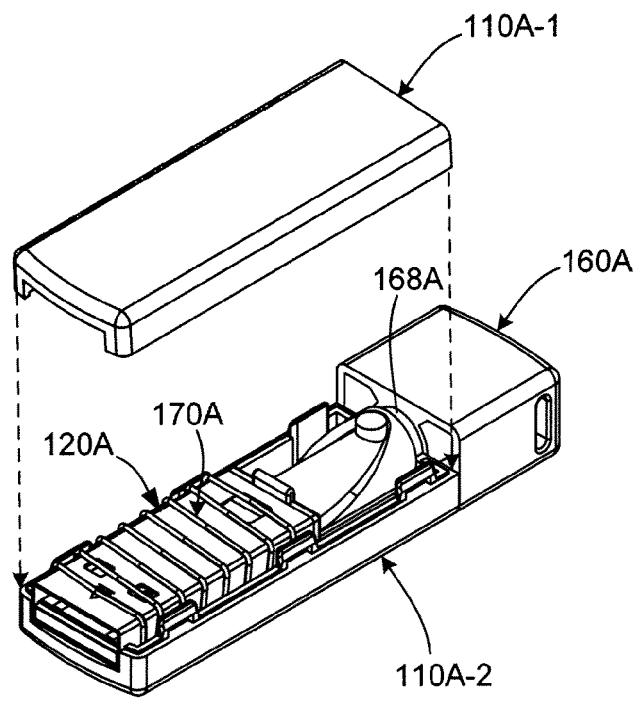

Referring to FIGS. 3(C) and 3(D), sliding rack assembly 120A, spring 170A and rear cap 160A are then mounted onto lower housing portion 110A-2, and then upper housing portion 110A-1 is mounted over lower housing portion 110A-2. As indicated in FIG. 3(A), to facilitate easy assembly, rear cap 160A is positioned such that positioning knob 127A is received in rear locking groove 167A-2, thereby allowing spring 170A to be installed inside front wall portion 111A-2. According to another aspect of the present embodiment, the rear wall portion of each housing portion 110A-1 and 110A-2 (e.g., rear wall portion 116A-2 of lower housing portion 110A-2) includes a substantially semicircular notch (e.g., notch 117A-2) that form a circular opening for receiving neck-like locking slot 168A of rear cap 160A, whereby rear cap 160A is rotatably secured to housing 110A (which is formed by housing portions 100A-1 and 100A-2, as shown in FIG. 5) upon complete assembly, as depicted in FIG. 3(B).

Figure 4A:
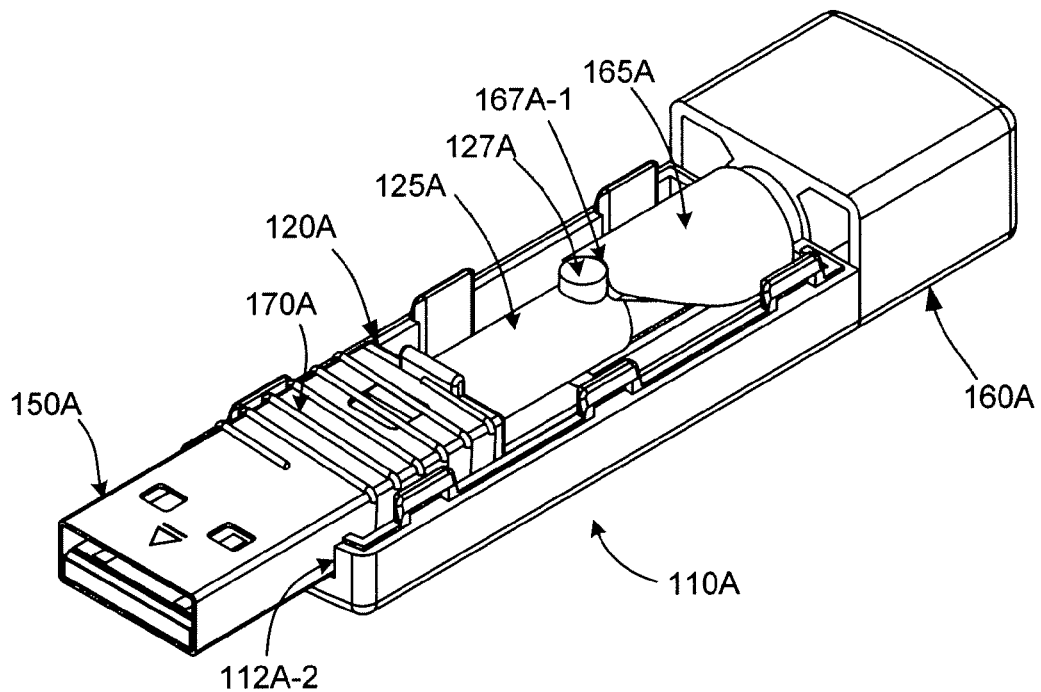
FIGS. 4(A) and 4(B) are partial perspective views showing the USB device of FIG. 2 with the upper housing portion removed.
Figure 4B:
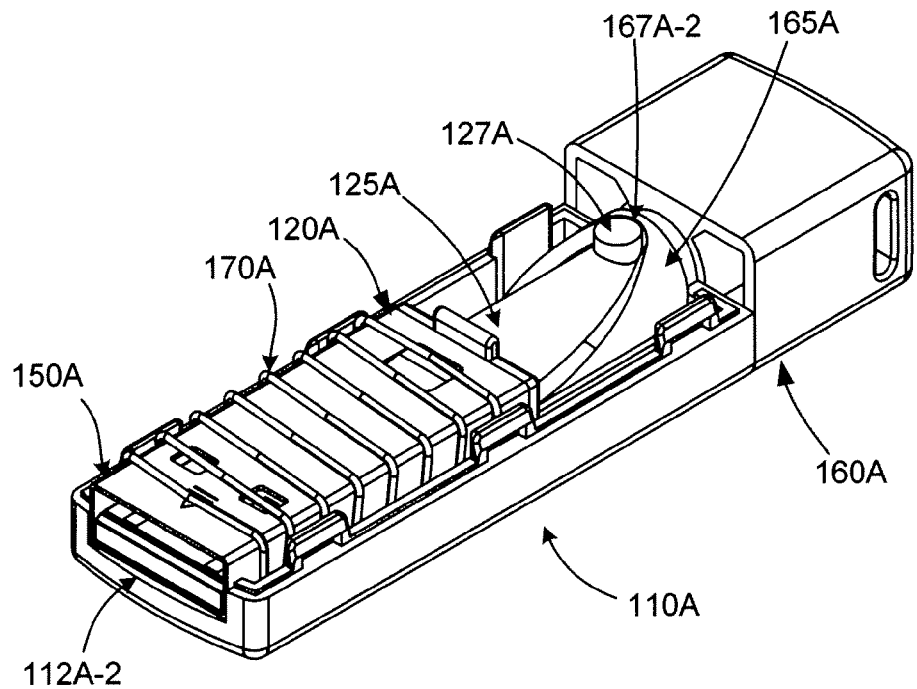

FIGS. 4(A) and 4(B) are partial perspective views showing USB device 100A with the upper housing portion removed to better illustrate its operation. According to the present invention, actuator portion 165A is operably engaged with positioning rod 125A such that manual rotation of rear cap 160A relative to housing 110A causes sliding rack assembly 120A to slide inside housing 110A between the deployed position shown in FIG. 4(A) and the retracted position shown in FIG. 4(B). According to an aspect of the present embodiment, this actuation is achieved by contact between positioning knob 127A, which is fixedly mounted or integrally formed on positioning rod 125A, and substantially oval cam surface 167A formed on hollow cylindrical wedge-shaped structure 166A. Note that spring 170A serves to bias sliding rack assembly 120 rearward (i.e., toward rear cap 160A), whereby positioning knob 127A is maintained in reliable contact with cam surface 167A. Note also that, as indicated in FIG. 4(A), when rear cap 160A is rotated to push plug connector 150A into the deployed position, positioning knob 127A enters and is secured in front locking groove 167A-1, thereby maintaining the deployed position until the user applies sufficient torque to force positioning knob 127A out of front locking groove 167A-1 against the bias of spring 170A. Spring 170A thus biases positioning knob 127A into rear locking groove 167A-2, whereby USB device 100A is maintained in the retracted position until the user applies sufficient torque to force positioning knob 127A back into front locking groove 167A-1 against the bias of spring 170A.

Figure 5:
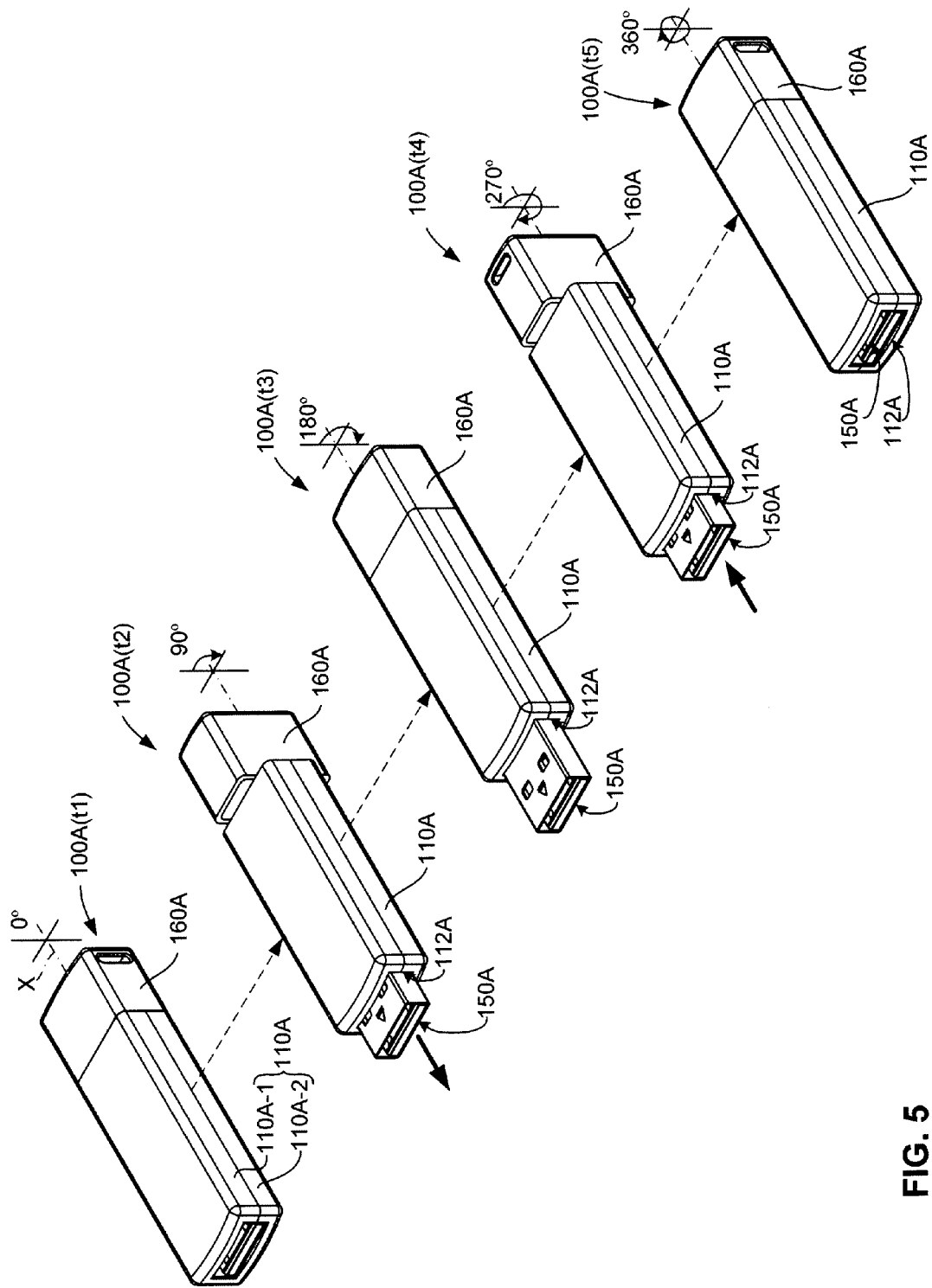
FIG. 5 includes sequential perspective views showing the USB device of FIG. 2 during operation.

FIG. 5 includes sequential perspective views showing USB device 100A during operation. As described with reference to FIGS. 4(A) and 4(B), the actuating mechanism of USB device 100A facilitates free rotation of rear cap 160A around longitudinal axis X relative to the housing 110A, whereby rear cap 160A can be turned an unlimited number of full rotations in both the clockwise and counterclockwise directions relative to the housing. For example, as illustrated in FIG. 5, USB device 100A(t1) is in the fully retracted position (i.e., rear cap 160A is subject to 0° of rotation around longitudinal axis X). Subsequent rotation of rear cap 160A around longitudinal axis X by a predetermined amount (e.g., 90°, as indicated by USB device 100A(t2) in FIG. 5) while housing 110A maintained in a stationary position causes the actuator portion 165A to push positioning rod 125A by way of contact between cam surface 167A and positioning knob 127A (shown in FIG. 4(B)) toward front wall 111A, thereby causing plug connector 150A to partially protrude through front opening 112A. Further rotation of rear cap 160A around longitudinal axis X (e.g., 180°, as indicated by USB device 100A(t3) in the center of FIG. 5) while housing 110A maintained in a stationary position causes actuator portion 165A to further push positioning rod 125A forward, thereby causing positioning knob 127A to enter front locking groove 167A-1, as shown in FIG. 4(A), whereby plug connector 150A is maintained in the fully deployed position. According to the present embodiment, subsequent rotation of rear cap 160A around longitudinal axis X (e.g., 270°, as indicated by USB device 100A(t4) in FIG. 5) while housing 110A maintained in a stationary position causes positioning knob 127A to detach from front locking groove 167A-1 (see FIG. 4(A)), which causes spring 170A to push sliding rack assembly 120A back toward rear cap 160A. Finally, when rotation of rear cap 160A around longitudinal axis X completes a circle (e.g., 360°, as indicated by USB device 100A(t5) in FIG. 5), positioning knob 127A reaches rear locking groove 167A-2 (see FIG. 4(B)), which causes spring 170A to settle in the fully retracted position. As described above, the deploy/retract actuating mechanism is constructed such that, when rear cap 160A is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of rotating cap 160A when sliding rack assembly 120A reaches the fully deployed or fully retracted positions inside housing 110A.

FIG. 6 is an exploded perspective view showing a freely rotating lipstick-type USB device 100B according to a second specific embodiment of the present invention. USB device 100B generally includes a housing 110B, a sliding rack assembly 120B, a spring 170B, and a rear cap 160B. Similar to USB device 100A, sliding rack assembly 120B is slidably mounted in housing 110B (e.g., between upper wall 114B-1 and lower wall 114B-2) and biased toward a back edge 116B of housing 110B by spring 170B. In addition, sliding rack assembly 120B includes a positioning rod 125B having a positioning knob 127B that is pressed against a substantially oval cam surface 167B formed on a wedge-shaped structure 166B includes to serve as an actuating mechanism for deploying/retracting a plug connector 150B, which is disposed on the front end of sliding rack assembly 120B, through a front opening 112B of housing 110B.

According to an aspect of the present embodiment, USB device 100B differs from USB device 100A (described above) in that housing 110B is an integrated (single-piece molded) structure, and USB device 100B further includes a coupler 180B that serves to secure a rear cap 160B to housing 110B. In particular, as indicated in FIG. 7(A), coupler 180B is a cap-like structure including a rear wall 181B defining a center opening 182B, opposing side walls 183B, and opposing upper and lower walls 184B-1 and 184B-2. Locking structures 187B are disposed on each of side walls 183B to facilitate snap-coupling of coupler 180B onto rear edge 116B of housing 110B. A peripheral edge of center opening 182B is formed with a series of slits to facilitate insertion of wedge-shaped structure 166B until the peripheral edge of center opening 182B aligns with locking slot 168B, whereby rear cap 160B is rotatably connected to housing 110B when coupler 180B is snap-coupled onto rear edge 116B of housing 110B, as indicated in FIG. 7(B).

Figure 8:
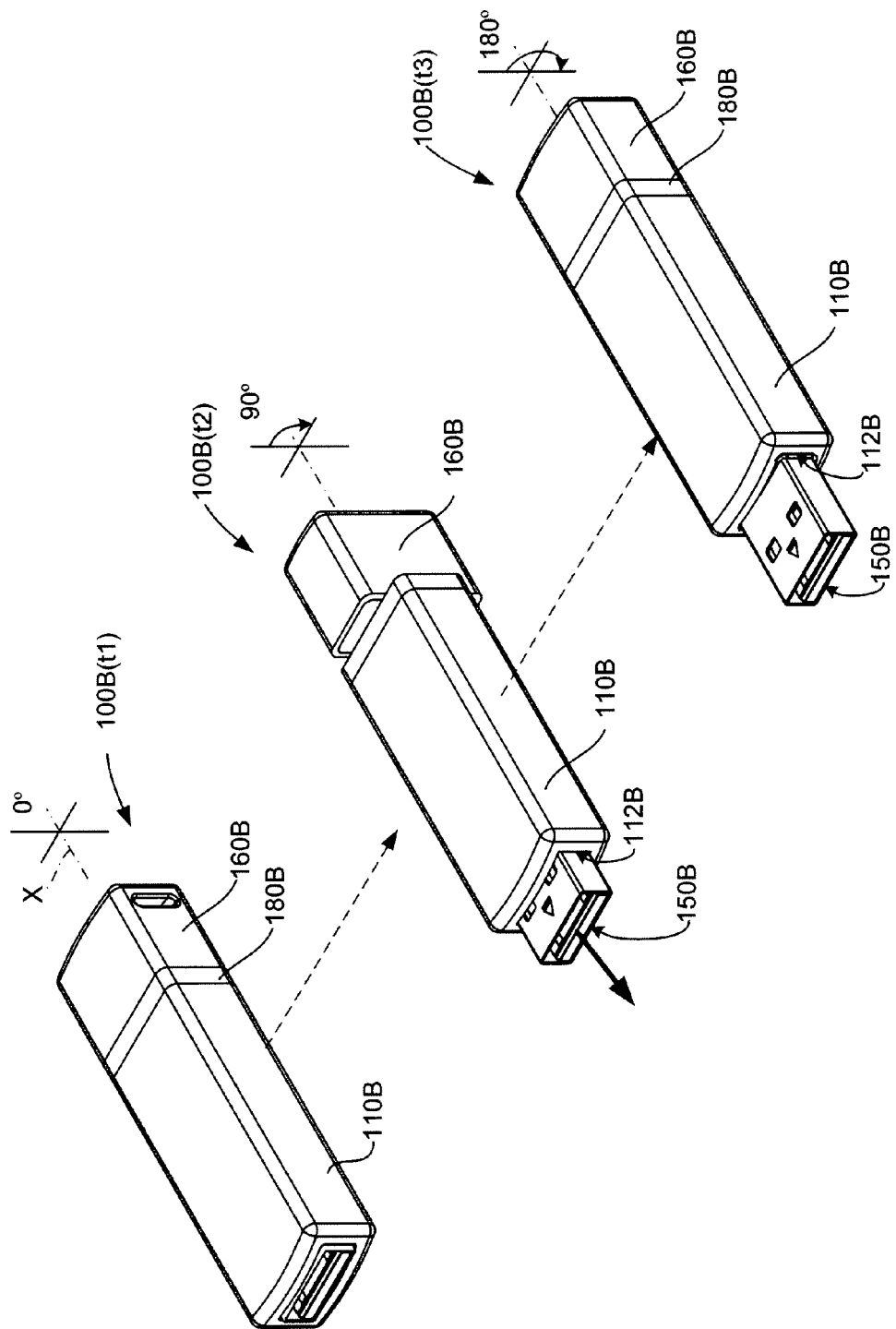
FIG. 8 includes sequential perspective views showing the USB device of FIG. 6 during operation.

FIG. 8 includes sequential perspective views showing USB device 100B during operation. Similar to USB device 100A, the actuating mechanism of USB device 100B facilitates free rotation of rear cap 160B around longitudinal axis X relative to the housing 110B, whereby rear cap 160B can be turned an unlimited number of full rotations in both the clockwise and counterclockwise directions relative to the housing. The difference to note in FIG. 8 is that coupler 180B remains fixed (stationary) relative to housing 110B during rotation of rear cap 160B. For example, as illustrated in FIG. 8, USB device 100B(t1) is in the fully retracted position (i.e., rear cap 160B is subject to 0° of rotation around longitudinal axis X). Subsequent rotation of rear cap 160B around longitudinal axis X by a predetermined amount (e.g., 90°, as indicated by USB device 100B(t2) in FIG. 8) while both housing 110B and coupler 180B are maintained in a stationary position causes the actuator mechanism (not shown) to push plug connector 150B such that it partially protrudes through front opening 112B. Further rotation of rear cap 160B around longitudinal axis X (e.g., 180°, as indicated by USB device 100B(t3)) while housing 110B and coupler 180B are maintained in a stationary position causes actuating mechanism to further push plug connector 150B into the fully deployed position.

Figure 9:
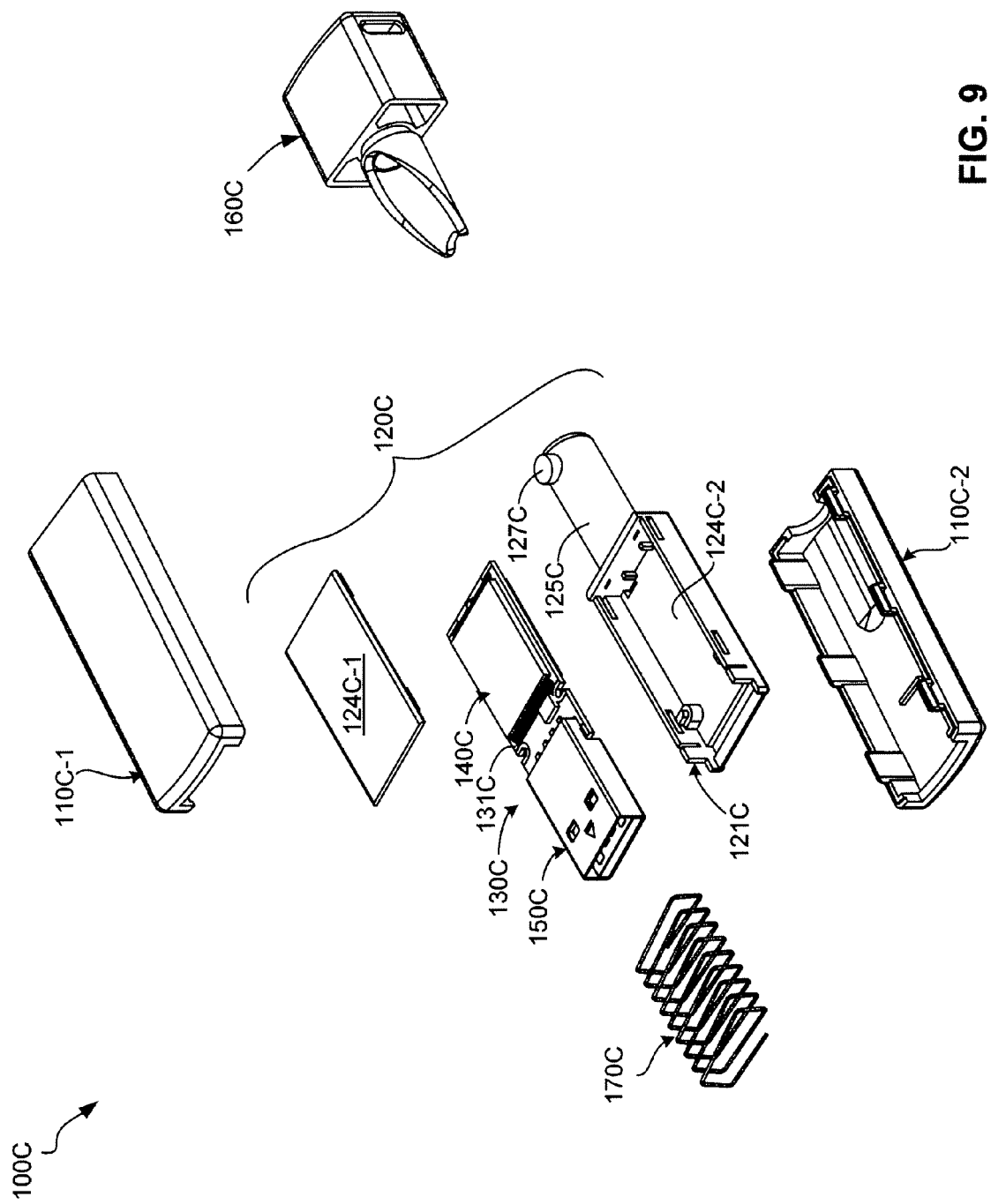
FIG. 9 is an exploded perspective view showing an exemplary USB device according to another specific embodiment of the present invention.

FIG. 9 is an exploded perspective view showing a freely rotating lipstick-type USB device 100C according to a third specific embodiment of the present invention. USB device 100C generally includes a two-part housing including upper housing portion 110C-1 and lower housing portion 100C-2, a sliding rack assembly 120C, a spring 170C, and a rear cap 160C. Similar to USB device 100A, sliding rack assembly 120C is slidably mounted between housing portions 110C-1 and 110C-2, which are snap-couplable as described above, and biased toward rear cap 160C by spring 170C. In addition, sliding rack assembly 120C includes a positioning rod 125C having a positioning knob 127C that is pressed against a substantially oval cam surface formed on rear cap 160C in the manner described above to deploy/retract a plug connector 150C, which is disposed on the front end of sliding rack assembly 120C.

Figure 10A:
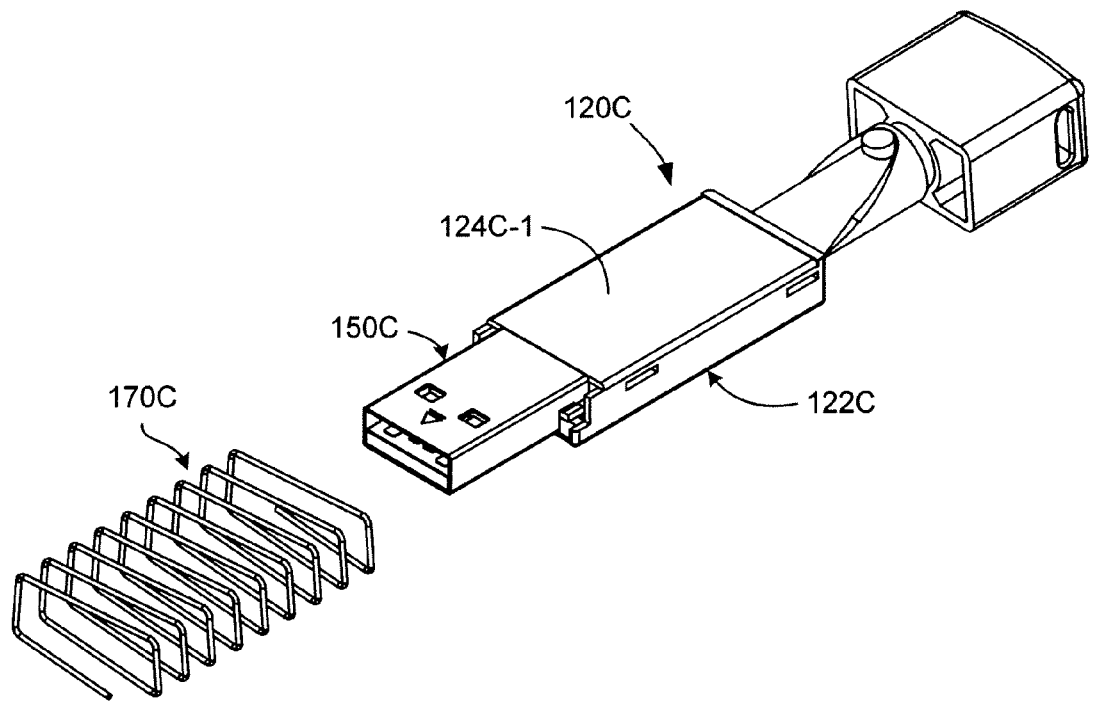
FIGS. 10(A) and 10(B) are perspective views showing a portion of the USB device of FIG. 9 during assembly.
Figure 10B:
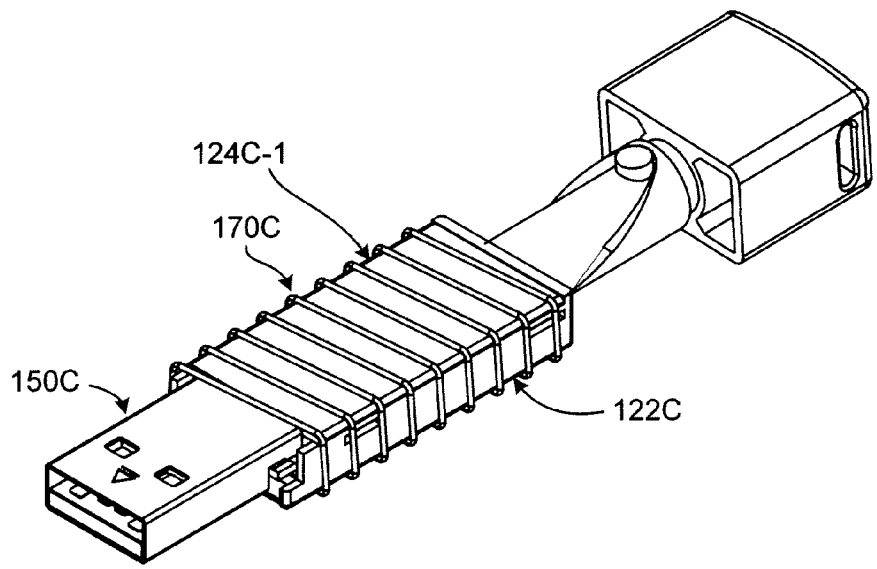

According to an aspect of the present embodiment, USB device 100C differs from USB devices 100A and 100B (described above) in that sliding rack assembly 120C includes a standard printed circuit board assembly (PCBA) 130C in which various electronic devices (e.g., memory device 140C) are mounted onto a standard printed circuit board (PCB) 131C, and plug connector 150C is connected to a front end of PCB 131C using known techniques. In addition, sliding rack assembly 120C includes a removable upper wall 124C-1 that is connected to carrier tray 122C over PCBA 131C (as shown in FIG. 10(A)) prior to the mounting of spring 170C over upper wall 124C-1 and carrier tray 122C (as shown in FIG. 10(B)). The sub-assembly shown in FIG. 10(B) is then mounted inside the housing portions (shown in FIG. 9) in a manner similar to that described above with reference to USB device 100A.

Figure 11:
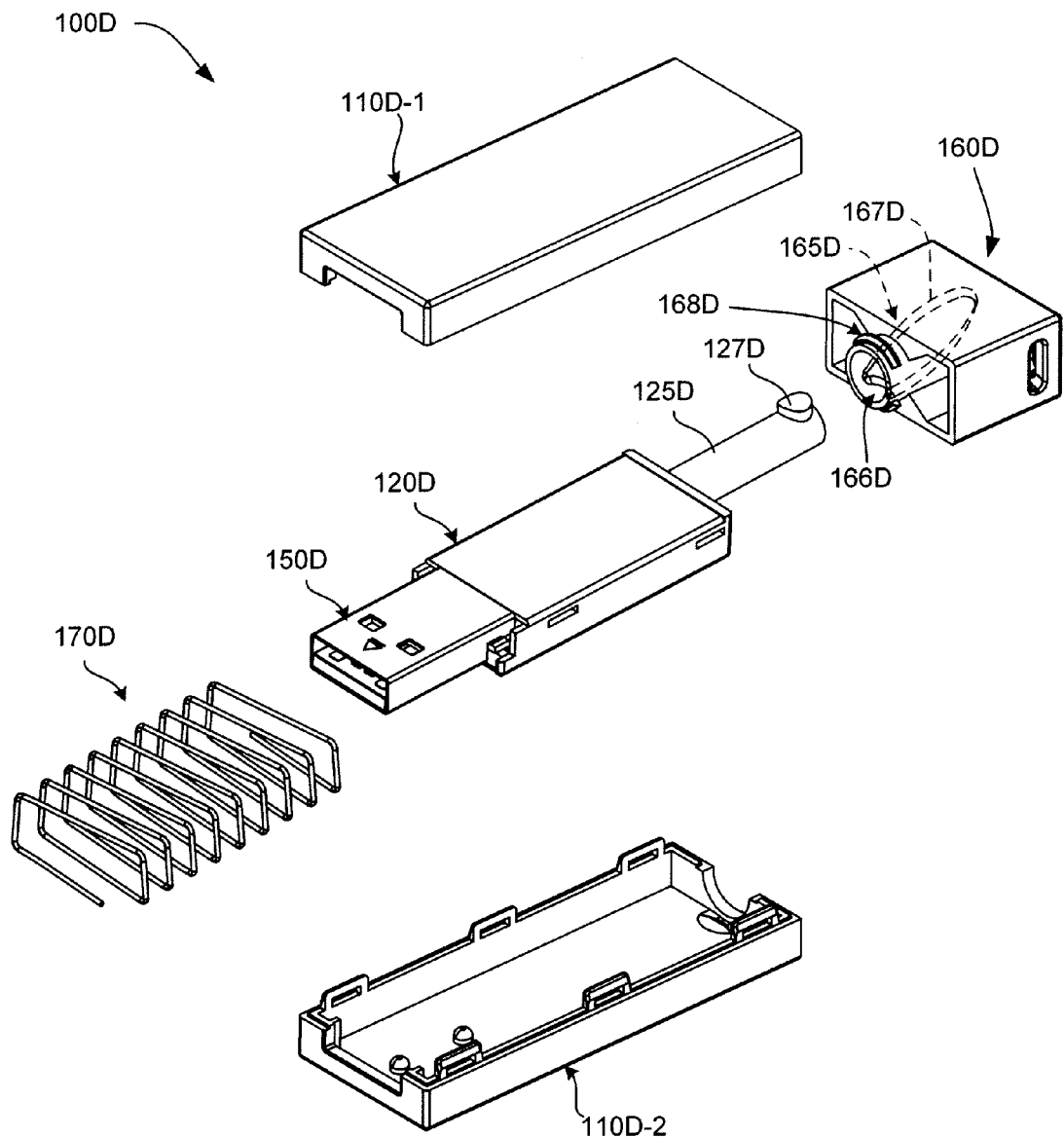
FIG. 11 is an exploded perspective view showing an exemplary USB device according to another specific embodiment of the present invention.

FIG. 11 is an exploded perspective view showing a freely rotating lipstick-type USB device 100D according to a fourth specific embodiment of the present invention. USB device 100D generally includes a two-part housing including upper housing portion 110D-1 and lower housing portion 100D-2, a sliding rack assembly 120D, a spring 170D, and a rear cap 160D. Similar to the USB device 100C, sliding rack assembly 120D includes a standard PCBA and is slidably mounted between housing portions 110D-1 and 110D-2, which are snap-couplable in a manner similar to that described above, and biased toward rear cap 160D by spring 170D. In addition, sliding rack assembly 120D includes a carrier tray 122D having a positioning rod 125D including a positioning knob 127D that is biased against rear cap 160D in the manner described above to deploy/retract a plug connector 150D, which is disposed on the front end of sliding rack assembly 120C.

Figure 12A:
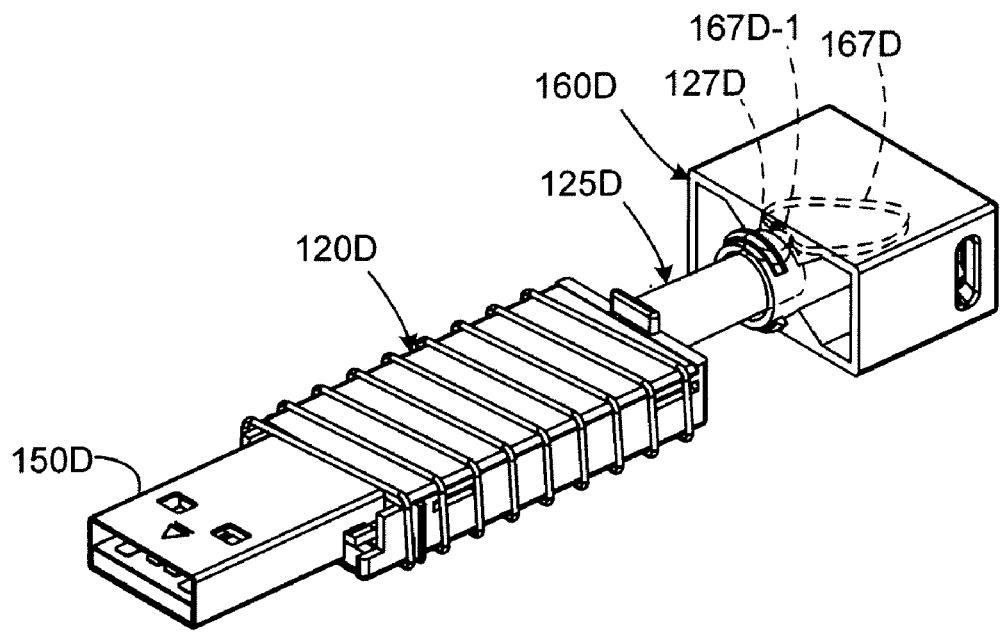
FIGS. 12(A) and 12(B) are perspective and simplified cross-sectional side views showing a portion of the USB device of FIG. 11 during operation.
Figure 12B:
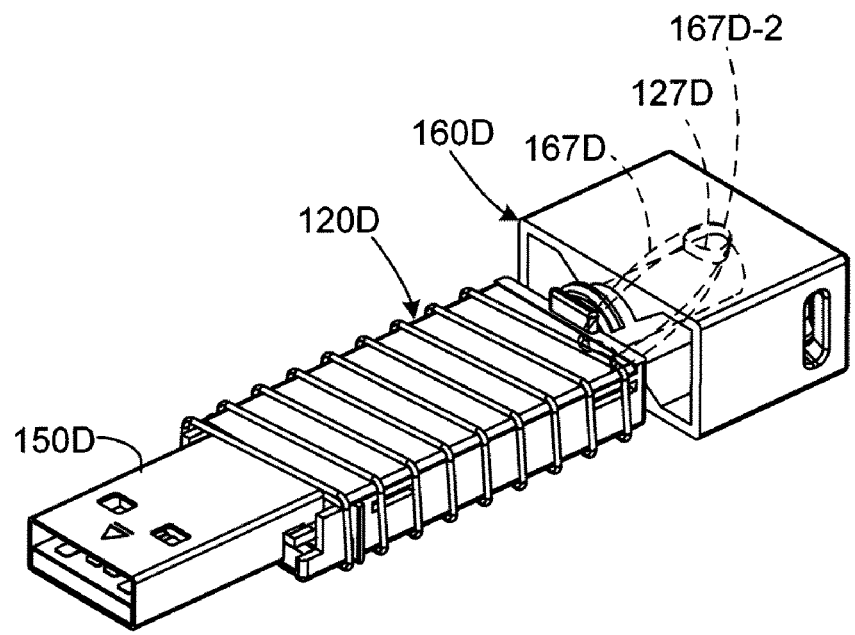

According to an aspect of the present embodiment, USB device 100D differs from the previously described USB devices in that actuator portion 165D of rear cap 160D includes a hollow cylindrical structure 166D disposed inside of the handle portion of rear cap 160D, and a substantially oval cam surface 167D is disposed on an inside surface of hollow cylindrical structure 166D. As illustrated in FIGS. 12(A) and 12(B), substantially oval cam surface 167D serves to position sliding rack assembly 120D in a manner similar to that described above with reference to USB device 100A, wherein positioning knob 127D slides along cam surface 167D in response to rotation of rear cap 160D relative to the housing (not shown), thereby positioning sliding rack assembly 120D by way of positioning rod 125D. Note that substantially oval cam surface 167D includes a front locking groove 167D-1 that receives positioning knob 127D to maintain plug connector 150D in the deployed position (see FIG. 12(A)) and a rear locking groove 167D-2 that maintains plug connector 150D in the retracted position (see FIG. 12(B)). An advantage of this embodiment is that the overall length of USB device 100D may be made shorter than that of the previous embodiments. Note that locking tabs 168D are provided on a protruding section of actuator portion 165D to facilitate rotatable connection of rear cap 160D to housing portions 110D-1 and 110D-2 during assembly in a manner similar to that described above.

Figure 13:
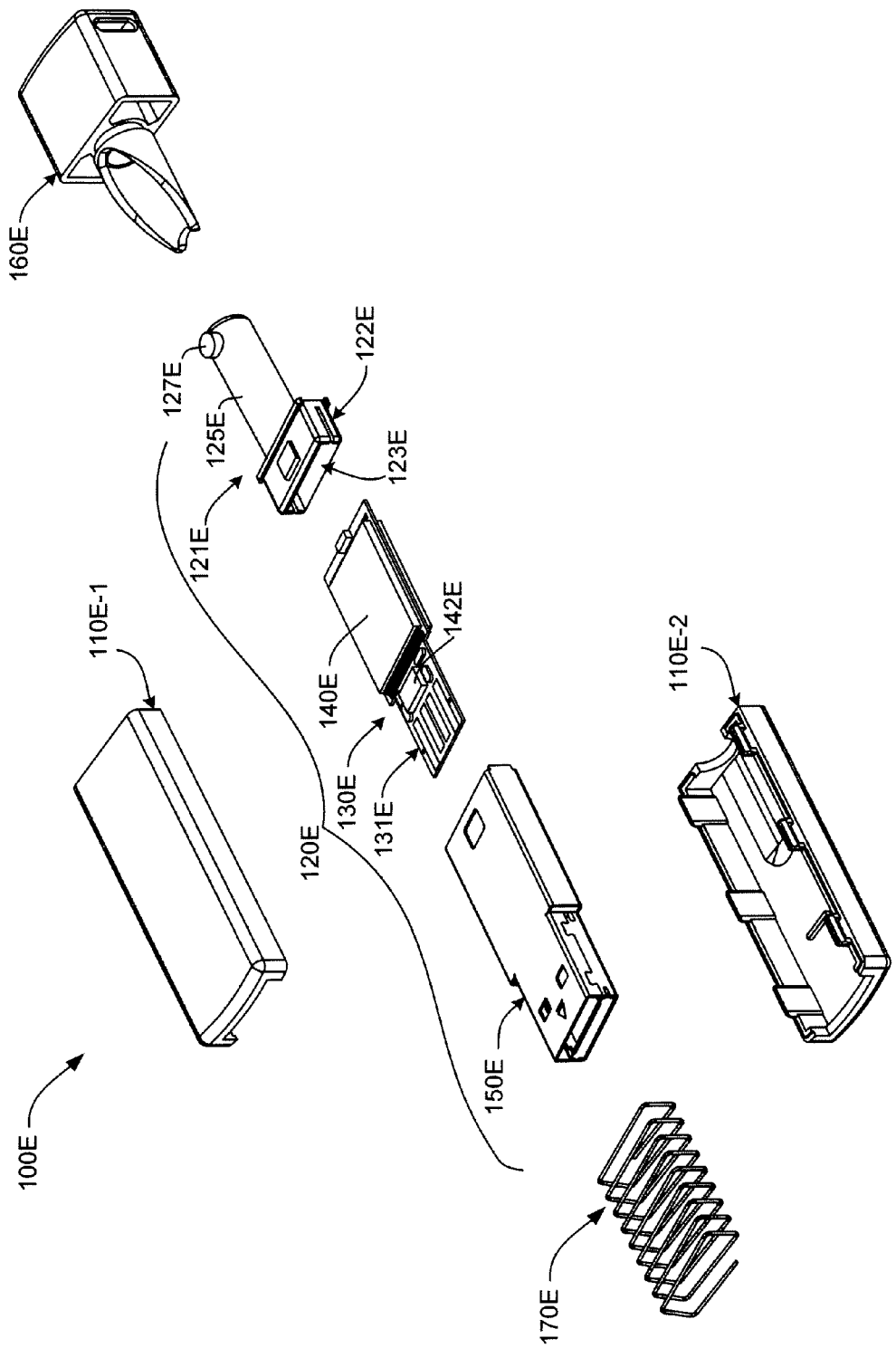
FIG. 13 is an exploded perspective view showing an exemplary USB device according to another specific embodiment of the present invention.

FIG. 13 is an exploded perspective view showing a freely rotating lipstick-type USB device 100E according to a fifth specific embodiment of the present invention. USB device 100E generally includes a two-part housing including upper housing portion 110E-1 and lower housing portion 100E-2, a sliding rack assembly 120E, a spring 170E, and a rear cap 160E. Sliding rack assembly 120E includes a slim USB PCBA 130E that is mounted inside a modified metal plug connector 150E and a carrier 121E that includes a tray 122E defining a hollow area 123E for receiving a rear end of PCBA 130E. The advantage of using slim PCBA 130E and modified USB plug connector 150E, when compared with previous embodiments, is that this slim PCB assembly has shorter length due to a partial PCB substrate 131E and a controller IC is placed inside the metal plug connector 150E.

FIGS. 14-17 illustrate describe a restricted rotation lipstick-type USB device 100F according to an alternative sixth embodiment of the present invention. In contrast to the freely rotating embodiments described above, the restricted rotation embodiment described below is characterized in that rotation of the rear cap is restricted to a limited number of rotations in either the clockwise or counterclockwise direction. However, to prevent damage to the actuating mechanism, USB device 100F includes stop structures that prevent over-rotation of the rear cap, thereby preventing damage to the actuating mechanism.

Figure 14:
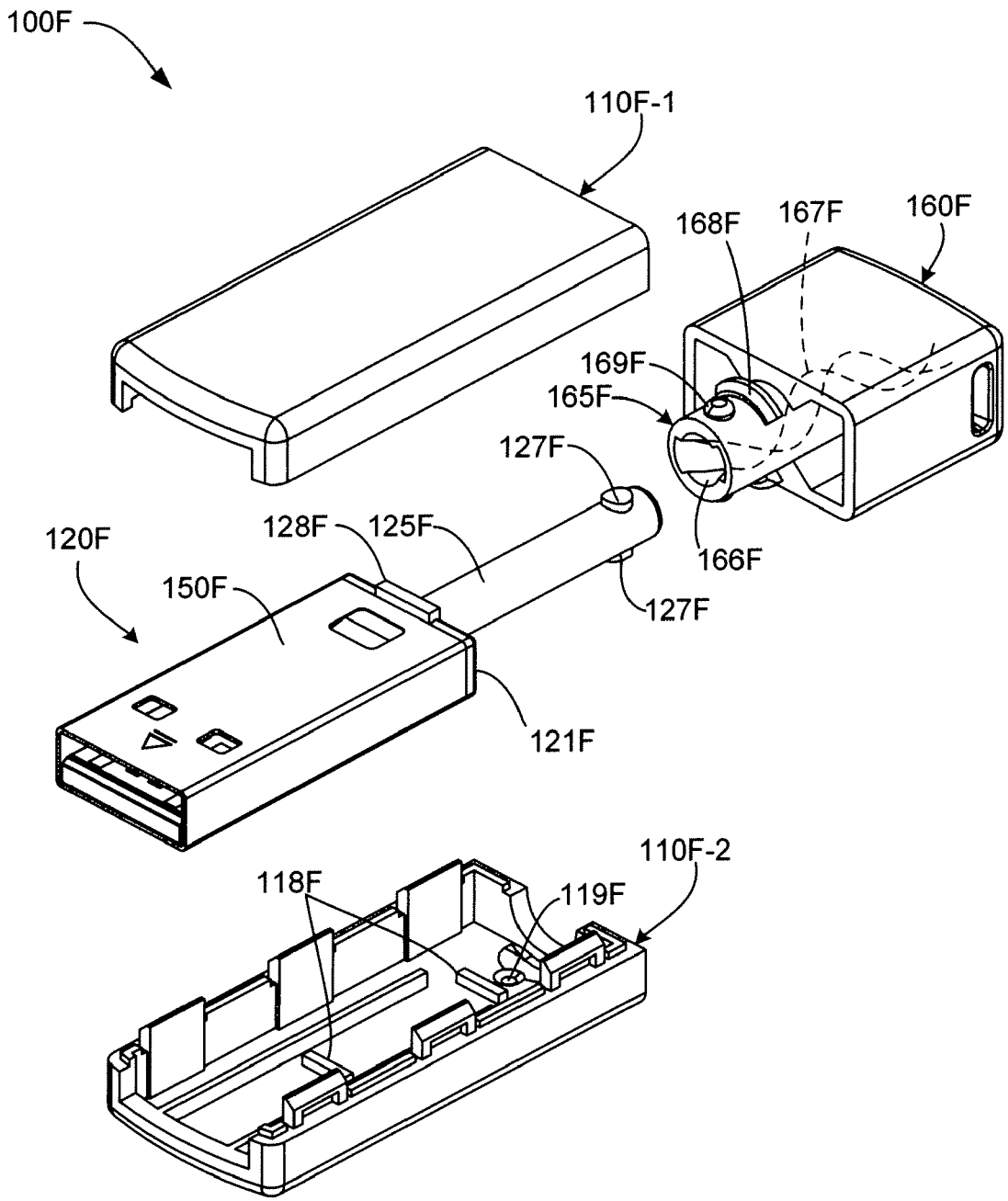
FIG. 14 is an exploded perspective view showing an exemplary USB device according to another specific embodiment of the present invention.
Figure 15:
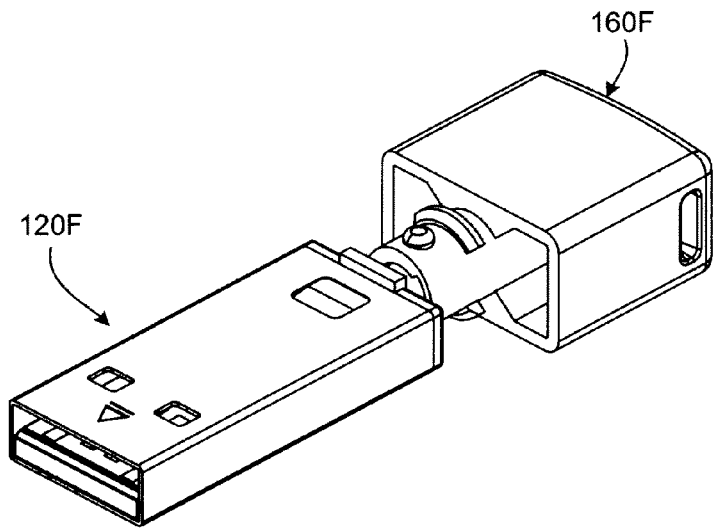
FIG. 15 is a perspective view showing a portion of the USB device of FIG. 14.

FIG. 14 is an exploded perspective view showing restricted rotation lipstick-type USB device 100F, which generally includes a two-part housing including upper housing portion 110F-1 and lower housing portion 100F-2, a sliding rack assembly 120F, and a rear cap 160F. Housing portions 110F-1 and 110F-2 are similar to those described above, and include structures that facilitate snap-coupled assembly. Housing portions 110F-1 and 110F-2 also include at least one stop structure 118F and at least one locking groove 119F that serve to prevent over-rotation and damage to the actuating mechanism in the manner described below. Sliding rack assembly 120F is constructed in a manner similar to that described above, and includes a metal plug connector 150F and a carrier 121F that includes a positioning rod 125F having two positioning knobs 127F. According to an aspect of the present embodiment, a restricting member 128F is disposed on sliding rack assembly 120F such that restricting member 128F contacts stop structures 118F when plug connector 150F is in one of the fully deployed and fully retracted positions, as described below. Rear cap 160F is formed in a manner similar to that described above with reference to USB device 100D, but instead of including an oval cam surface, an actuator 165F includes a hollow cylindrical structure 166F having a spiral cam surface 167F that is disposed on an inside surface of hollow cylindrical structure 166F. In addition, a protruding section of actuator 165F includes locking tabs 168F that facilitate rotatable connection of rear cap 160F to housing portions 110F-1 and 110F-2 during assembly in a manner similar to that described above. The protruding section of actuator 165F also includes one or more locking protrusions 169F that serve to restrict rotation of rear cap 160F in the manner described below. FIG. 15 is a perspective view showing sliding rack assembly 120F operably connected to rear cap 160F in a manner similar to that described above with reference to USB 100D.

Figure 16A:
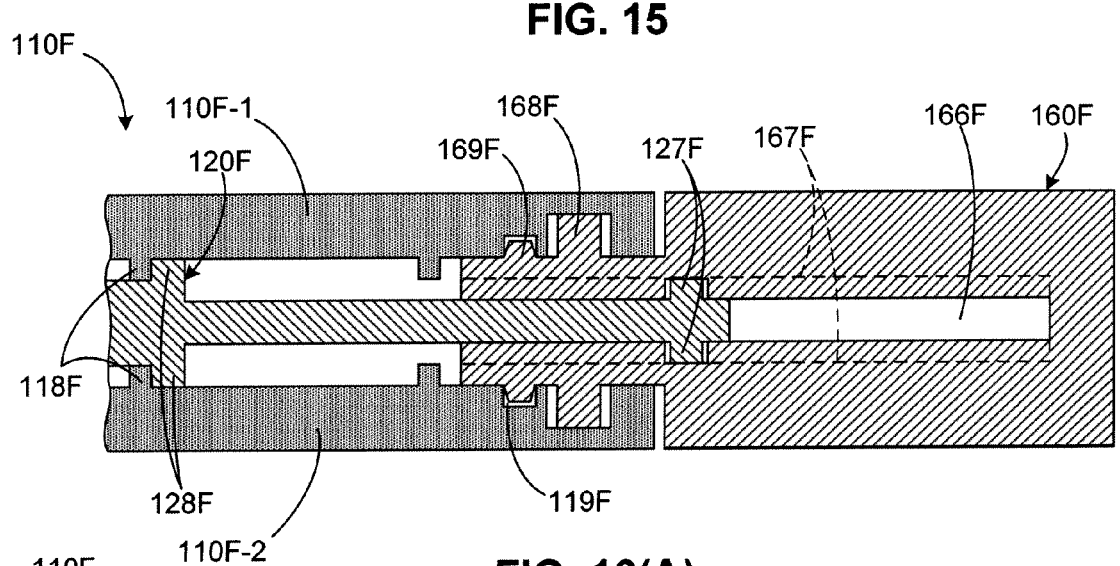
FIGS. 16(A) and 16(B) are perspective and simplified cross-sectional side views showing a portion of the USB device of FIG. 14.
Figure 16B:
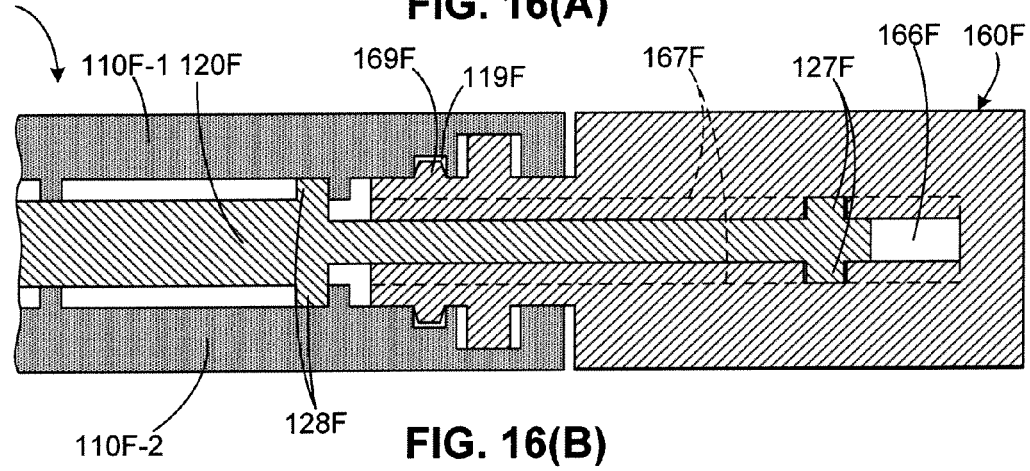
Figure 17:
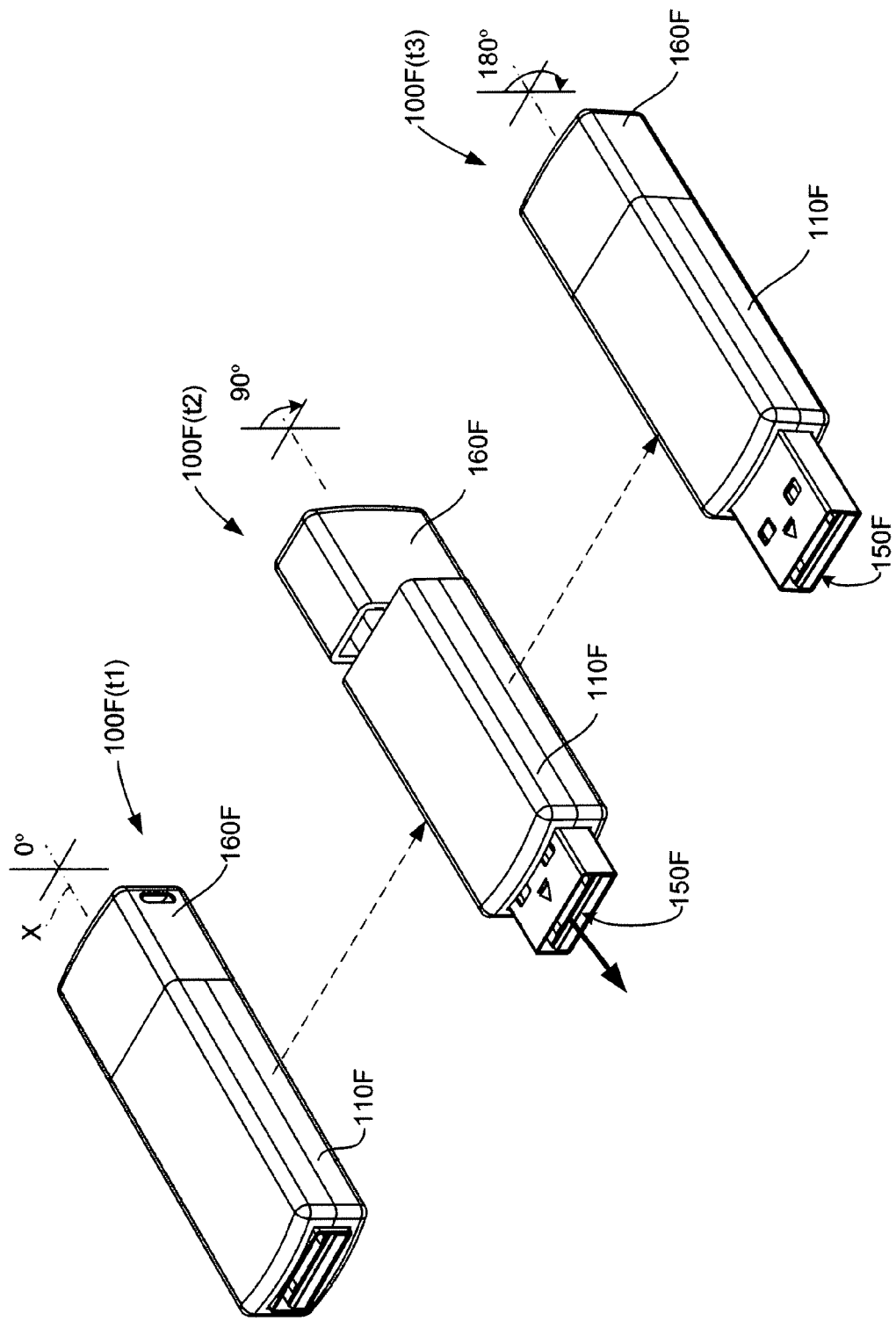
FIG. 17 includes sequential perspective views showing the USB device of FIG. 14 during operation.

FIGS. 16(A) and 16(B) are simplified cross-sectional side views and FIG. 17 includes perspective views showing USB device 100F during operation. As indicated in FIG. 17, the actuating mechanism of USB device 100F restricts rotation of rear cap 160F to 180° around longitudinal axis X relative to housing 110F. That is, rear cap 160F can only be rotated in one direction (e.g., clockwise) from the fully retracted position to the fully deployed position. For example, USB device 100F(t1) shows rear cap 160F at 0° of rotation around longitudinal axis X with plug connector 150F fully retracted, USB device 100F(t2) shows rear cap 160F at 90° of rotation around longitudinal axis X with plug connector 150F partially deployed, and USB device 100F(t3) shows rear cap 160F at 180° of rotation around longitudinal axis X with plug connector 150F fully deployed. FIGS. 16(A) and 16(B) show USB device 110F if the fully deployed and fully retracted positions, respectively. Referring again to FIG. 16(A), with sliding rack assembly 120F in the fully retracted position, further rotation of rear cap 160F in the counterclockwise direction is prevented by contact between restricting members 128F provided on sliding rack assembly 120F and stop structures 118F that are provided on housing portions 110F-1 and 110F-2, and by engagement of locking protrusions 169F on rear cap 160F in locking grooves 119F that are defined in housing portions 110F-1 and 110F-2. Similarly, as shown in FIG. 16(B), with sliding rack assembly 120F in the fully deployed position, further rotation of rear cap 160F in the clockwise direction is prevented by contact between stop structures 118F and restricting members 128F, and by engagement of locking protrusions 169F in locking grooves 119F.

Although the present invention has been described with respect to certain specific embodiments, it will be clear to those skilled in the art that the inventive features of the present invention are applicable to other embodiments as well, all of which are intended to fall within the scope of the present invention. For example, those skilled in the art will recognize that each of USB devices may be modified to implement other PCBA types (e.g., surface mount technology (SMT)-type USB PCBAs). In addition, the various device structures may be modified to implement other types of portable computer peripheral apparatus, for example, by modifying the plug connector to include an interface circuit and plug structure that supports Secure Digital (SD), Micro SD, Multi-Media Card (MMC), Compact Flash (CF), Memory Stick (MS), PCI-Express, a Integrated Drive Electronics (IDE), Serial Advanced Technology Attachment (SATA), external SATA, Radio Frequency Identification (RFID), fiber channel and optical connection protocols.

The invention claimed is:

1. A lipstick-type portable computer peripheral apparatus comprising:

a housing having a front end portion defining a front opening, opposing side walls and opposing upper and lower walls extending from the front end portion and defining an elongated central cavity, and a rear edge disposed at a back portion of the central cavity;

sliding rack assembly movably disposed in the housing such that the sliding rack assembly is slidable along a longitudinal axis extending through the elongated central cavity, the sliding rack assembly including:

a carrier including a carrier tray and an elongated positioning rod extending from a rear portion of the carrier tray;

at least one electronic device fixedly connected to the carrier;

a plug connector mounted on the carrier and disposed at a front end of the sliding rack assembly;

a rear cap rotatably connected to the housing and including an actuator portion operably engaged with the positioning rod such that manual rotation of the rear cap relative to the housing around the longitudinal axis causes the sliding rack assembly to slide inside the housing between a retracted position in which said plug connector is disposed inside of the housing, and a deployed position in which said plug connector is exposed outside said front opening for operable coupling to a host system.

2. The lipstick-type portable computer peripheral apparatus according to claim 1,
wherein the carrier further comprises one or more positioning knobs disposed on the positioning rod,
wherein the actuator portion of the rear cap includes one of an oval cam surface and a spiral groove, and
wherein the positioning knob is operably engaged with said one of an oval cam surface and a spiral groove such that the positioning knob remains coupled to the actuator portion while the sliding rack assembly is slid between the retracted position and the deployed position.

3. The lipstick-type portable computer peripheral apparatus according to claim 1, wherein the rear cap further comprises opposing upper and lower walls, and the actuating mechanism is disposed such that the upper and lower walls of the rear cap are substantially co-planar with the opposing upper and lower walls of the housing when the plug connector is in both the fully deployed and fully retracted positions.

4. The lipstick-type portable computer peripheral apparatus according to claim 1, wherein the portable computer peripheral apparatus comprises a Universal Serial Bus (USB) device wherein the plug connector includes a substrate having four of metal contacts formed thereon, and a metal plug shell that extends over substrate in accordance with an established USB standard.

5. The lipstick-type portable computer peripheral apparatus according to claim 1, wherein said actuator portion is engaged with said positioning rod such that the rear cap is freely rotatable around the longitudinal axis relative to the housing.

6. The lipstick-type portable computer peripheral apparatus according to claim 5,
wherein the carrier further comprises one or more positioning knobs disposed on the positioning rod,
wherein the actuator portion includes a substantially oval cam surface, and
wherein the apparatus further comprises a resilient member operably disposed in the housing to bias the sliding rack assembly toward the rear cap such that the one or more positioning knobs are slidably pressed against the cam surface, whereby the force exerted on the positioning knobs by the cam surface while the rear cap is rotated relative to the housing causes displacement of the sliding rack assembly inside the housing between the deployed position and the retracted position.

7. The lipstick-type portable computer peripheral apparatus according to claim 6,
wherein the substantially oval cam surface includes a first locking groove and a second locking groove, the first locking groove being disposed on the substantially oval cam surface at a position closer to the resilient member than that of the second locking groove, whereby when the rear cap is rotated relative to the housing such that the positing knob enters the first locking groove, the sliding rack assembly is stably maintained in the deployed position, and when the rear cap is rotated relative to the housing such that the positing knob enters the second locking groove, the sliding rack assembly is stably maintained in the retracted position.

8. The lipstick-type portable computer peripheral apparatus according to claim 7, wherein the actuator portion comprises a hollow cylindrical wedge-shaped structure extending into said housing, said hollow cylindrical wedge-shaped structure having a peripheral edge defining said substantially oval cam surface.

9. The lipstick-type portable computer peripheral apparatus according to claim 7, wherein the actuator portion comprises a hollow cylindrical structure disposed inside of the rear cap, and said substantially oval cam surface is disposed on an inside surface of said hollow cylindrical structure.

10. The lipstick-type portable computer peripheral apparatus according to claim 7,
wherein the rear cap includes a locking structure defining a locking slot, and
wherein the housing comprises a first housing portion and a second housing portion that is snap-couplable to the first housing portion, each of the first and second housing portions having a rear wall defining an opening portion disposed such that a portion of each back wall enters the locking slot when the second housing portion is snap-coupled to the first housing portion, thereby rotatably connecting the rear cap to the housing.

11. The lipstick-type portable computer peripheral apparatus according to claim 7,
wherein the rear cap includes a locking slot, and
wherein the housing further comprises a coupler that is snap-coupled to the rear edge of the housing and defines a center opening that engages the locking slot such that the rear cap is rotatably connected to the housing by way of the coupler.

12. The lipstick-type portable computer peripheral apparatus of claim 1,
wherein the carrier tray includes an upper tray portion and a lower tray portion that form a clip-like structure,
wherein said at least one electronic device is disposed in a Chip-On-Board (COB) package that is secured to said carrier by said clip-like structure.

13. The lipstick-type portable computer peripheral apparatus of claim 1,
wherein said at least one electronic device is disposed on a printed circuit board (PBC), and said plug connector is connected to a front end of the PCB, and,
wherein said carrier tray includes a removable upper wall that is snap-coupled to said carrier tray over said PCB.

14. The lipstick-type portable computer peripheral apparatus of claim 1, wherein said at least one electronic device is disposed in a Slim Printed Circuit Board Assembly (Slim PCBA) package.

15. The lipstick-type portable computer peripheral apparatus according to claim 1, wherein the actuator portion comprises a hollow cylindrical structure disposed inside of the rear cap, and the hollow cylindrical structure defines a spiral cam surface that is disposed on an inside surface of said hollow cylindrical structure.

16. The lipstick-type portable computer peripheral apparatus according to claim 15,
wherein the housing comprises at least one stop structure and at least one locking groove,
wherein the sliding rack assembly includes a restricting member that contacts the at least one stop structure when the plug connector is in one of the fully deployed and fully retracted positions, and
wherein the rear cap includes at least one locking protrusion that engages the at least one locking groove when the plug connector is in one of the fully deployed and fully retracted positions.

17. The lipstick-type portable computer peripheral apparatus of claim 1, wherein the plug connector includes an interface circuit including means for implementing one of a Universal Serial Bus (USB), a Secure Digital (SD), a Micro SD, Multi-Media Card (MMC), a Compact Flash (CF), a Memory Stick (MS), a PCI-Express, a Integrated Drive Electronics (IDE), a Serial Advanced a Technology Attachment (SATA), an external SATA, a Radio Frequency Identification (RFID), a fiber channel and an optical connection protocol.

* * * * *